United States Patent
Lyon et al.

(10) Patent No.: US 9,656,804 B2
(45) Date of Patent: May 23, 2017

(54) WAREHOUSE MANAGEMENT SYSTEM

(71) Applicant: HOJ ENGINEERING AND SALES CO., INC., Salt Lake City, UT (US)

(72) Inventors: Robert Glen Lyon, Bluffdale, UT (US); Clinton Furse, Riverton, UT (US)

(73) Assignee: Hoj Engineering & Sales Co., Inc., Salt Lake City, UT (US)

( * ) Notice: Subject to any disclaimer, the term of this patent is extended or adjusted under 35 U.S.C. 154(b) by 59 days.

(21) Appl. No.: 14/452,375

(22) Filed: Aug. 5, 2014

(65) Prior Publication Data
US 2015/0081088 A1    Mar. 19, 2015

Related U.S. Application Data

(63) Continuation-in-part of application No. 13/717,437, filed on Dec. 17, 2012.
(Continued)

(51) Int. Cl.
*A01K 5/02*    (2006.01)
*G06F 17/50*    (2006.01)
(Continued)

(52) U.S. Cl.
CPC ....... *B65G 1/1373* (2013.01); *G06Q 10/0875* (2013.01); *H04L 67/10* (2013.01);
(Continued)

(58) Field of Classification Search
CPC .... G06Q 10/00; G06Q 10/10; G06Q 10/0631; G06Q 10/06; G06Q 30/00; G06F 7/00; G06F 17/00; G06F 9/46
(Continued)

(56) References Cited

U.S. PATENT DOCUMENTS 4,336,589 A * 6/1982 Smith .................... G06Q 10/08
                                                    198/418
5,393,965 A * 2/1995 Bravman ............. G06K 7/1486
                                                    235/383
(Continued)

FOREIGN PATENT DOCUMENTS

EP    1 522 507 A1    4/2005
JP    11-116013        4/1999
(Continued)

OTHER PUBLICATIONS

Picking strategies that spell success: Having the right picking system for your operation will reduce cost and get orders to customers quickly. (design plans & ideas). (2002). Modern Materials Handling, 57(8), d5(12). Retrieved from http://dialog.proquest.com/professional/docview/678322493?accountid=142257.*

(Continued)

*Primary Examiner* — Olusegun Goyea
(74) *Attorney, Agent, or Firm* — Thorpe North & Western

(57) ABSTRACT

A warehouse management method using a pick platform may include associating a mobile computing device with a pick platform based on an identifier associated with the pick platform. A platform profile for the pick platform may be identified based on the identifier. Portions of the platform profile may be displayed using a platform profile map of the pick platform on the mobile computing device representing locations on the pick platform to which an item included in a plurality of orders is to be put.

21 Claims, 14 Drawing Sheets

Related U.S. Application Data

(60) Provisional application No. 61/577,979, filed on Dec. 20, 2011.

(51) Int. Cl.

| | | |
|---|---|---|
| *G06Q 10/00* | (2012.01) | |
| *B65G 1/137* | (2006.01) | |
| *H04L 29/08* | (2006.01) | |
| *G06Q 10/08* | (2012.01) | |
| *G06Q 10/06* | (2012.01) | |
| *G06Q 10/10* | (2012.01) | |
| *G06F 7/00* | (2006.01) | |
| *G06F 9/46* | (2006.01) | |
| *G06Q 30/00* | (2012.01) | |

(52) U.S. Cl.
CPC .............. *G06F 7/00* (2013.01); *G06F 9/46* (2013.01); *G06Q 10/00* (2013.01); *G06Q 10/06* (2013.01); *G06Q 10/10* (2013.01); *G06Q 30/00* (2013.01)

(58) Field of Classification Search
USPC ...... 705/7.13–7.16, 22, 28, 29; 235/380–385
See application file for complete search history.

(56) References Cited

U.S. PATENT DOCUMENTS

| | | | |
|---|---|---|---|
| 5,395,206 A * | 3/1995 | Cerny, Jr. ............. | B65G 1/1378 414/270 |
| 5,812,986 A | 9/1998 | Danelski | |
| 5,853,181 A | 12/1998 | Booras | |
| 5,877,962 A | 3/1999 | Radcliffe | |
| 5,934,864 A | 8/1999 | Lyon et al. | |
| 5,953,234 A | 9/1999 | Singer et al. | |
| 6,721,762 B1 * | 4/2004 | Levine ................... | G06Q 10/04 |
| 6,762,382 B1 | 7/2004 | Danelski | |
| 6,762,681 B1 | 7/2004 | Danelski | |
| 6,775,588 B1 | 8/2004 | Peck | |
| 6,847,861 B2 * | 1/2005 | Lunak ..................... | B65G 1/12 221/2 |
| 6,876,902 B2 | 4/2005 | Nikolich | |
| 6,876,958 B1 * | 4/2005 | Chowdhury ........... | G06Q 10/04 414/801 |
| 7,040,541 B2 * | 5/2006 | Swartz ................... | G06K 17/00 235/462.46 |
| 7,077,318 B2 | 7/2006 | Venema et al. | |
| 7,139,637 B1 * | 11/2006 | Waddington ........... | G06Q 10/04 700/216 |
| 7,155,166 B2 * | 12/2006 | Swan ..................... | G06Q 10/087 340/572.1 |
| 7,158,856 B2 | 1/2007 | Sheehan et al. | |
| 7,258,241 B2 | 8/2007 | Reid | |
| 7,516,848 B1 * | 4/2009 | Shakes ................... | B07C 5/38 209/34 |
| 7,667,148 B2 | 2/2010 | Mansfield et al. | |
| 7,853,492 B1 * | 12/2010 | Kirklin ................. | G06Q 10/087 280/79.2 |
| 7,865,263 B2 | 1/2011 | Spano, Jr. et al. | |
| 7,865,398 B2 * | 1/2011 | Schon ................... | G06Q 10/08 705/22 |
| 7,945,455 B2 | 5/2011 | Zimmermann | |
| 8,055,377 B2 * | 11/2011 | Yair ....................... | G06Q 10/08 414/273 |
| 9,043,235 B1 | 5/2015 | Sacks | |
| 2001/0030232 A1 * | 10/2001 | Piatek ................... | G06Q 10/08 235/375 |
| 2002/0059121 A1 | 5/2002 | Schneider et al. | |
| 2002/0087231 A1 * | 7/2002 | Lewis .................. | B65G 1/1373 700/230 |
| 2002/0115341 A1 * | 8/2002 | Hein ...................... | H01R 25/14 439/495 |
| 2002/0165639 A1 | 11/2002 | England et al. | |
| 2003/0155731 A1 * | 8/2003 | Ditges .................... | B62B 3/006 280/47.35 |
| 2003/0233165 A1 * | 12/2003 | Hein ..................... | G06Q 10/087 700/216 |
| 2004/0024730 A1 | 2/2004 | Brown et al. | |
| 2004/0181467 A1 * | 9/2004 | Raiyani ............... | G06Q 10/087 705/28 |
| 2004/0188523 A1 * | 9/2004 | Lunak ..................... | B65G 1/12 235/385 |
| 2004/0188524 A1 * | 9/2004 | Lunak ..................... | B65G 1/12 235/385 |
| 2004/0217564 A1 * | 11/2004 | Ditges .................... | B62B 3/006 280/79.3 |
| 2005/0071234 A1 * | 3/2005 | Schon ................... | G06Q 10/08 705/22 |
| 2005/0103842 A1 * | 5/2005 | Bong ................... | G06Q 10/087 235/385 |
| 2005/0230472 A1 * | 10/2005 | Chang .................. | G06Q 20/343 235/383 |
| 2006/0020366 A1 * | 1/2006 | Bloom .................... | B07C 3/00 700/226 |
| 2006/0025883 A1 * | 2/2006 | Reeves ................. | G06Q 10/08 700/216 |
| 2006/0054692 A1 * | 3/2006 | Dickey ................... | C08F 10/00 235/385 |
| 2006/0255951 A1 * | 11/2006 | Roeder ..................... | B62B 3/06 340/572.7 |
| 2007/0067200 A1 * | 3/2007 | Patel ...................... | G06Q 10/06 705/7.14 |
| 2007/0142961 A1 * | 6/2007 | Bhasin .................. | G06Q 10/08 700/216 |
| 2008/0167884 A1 * | 7/2008 | Mountz ............... | G06Q 10/087 705/29 |
| 2008/0183324 A1 | 7/2008 | Krisnamuthi et al. | |
| 2008/0183326 A1 | 7/2008 | Danelski | |
| 2008/0183327 A1 | 7/2008 | Danelski | |
| 2008/0183328 A1 | 7/2008 | Danelski | |
| 2008/0215179 A1 * | 9/2008 | Yair ..................... | G06Q 10/087 700/215 |
| 2008/0316045 A1 | 12/2008 | Sriharto et al. | |
| 2009/0152345 A1 * | 6/2009 | Johnson ................. | G06Q 10/06 235/381 |
| 2010/0057245 A1 | 3/2010 | Hironaka | |
| 2010/0175965 A1 * | 7/2010 | Fukuda ............ | G05B 19/41815 198/339.1 |
| 2010/0316468 A1 * | 12/2010 | Lert ........................ | B65G 1/045 414/273 |
| 2010/0324959 A1 * | 12/2010 | Templeton ............. | G06Q 10/08 705/334 |
| 2011/0320320 A1 * | 12/2011 | Dearlove ............... | G06Q 10/08 705/27.1 |
| 2012/0029962 A1 * | 2/2012 | Podgurny .............. | G06Q 10/06 705/7.13 |
| 2012/0330458 A1 | 12/2012 | Weiss | |

FOREIGN PATENT DOCUMENTS

| | | |
|---|---|---|
| JP | 2002-187605 | 7/2002 |
| JP | 2003-321111 | 11/2003 |
| WO | WO 2008/061253 A2 | 5/2008 |

OTHER PUBLICATIONS

Warehousing. (1992). Beverage Industry, , 15. Retrieved from http://dialog.proquest.com/professional/docview/671383407?accountid=142257.*

Seiko doubles pick rates with real-time inventory control. (1998). Modern Materials Handling, , S8. Retrieved from http://dialog.proquest.com/professional/docview/765701967?accountid=142257.*

Paris, W.F. III; "Automated Warehouse System Expedites Medical Resupply to Hospital Departments"; Industrial Engineer, Oct. 1998, vol. 20, No. 10, pp. 36-37, 39.

(56) References Cited

OTHER PUBLICATIONS

IPTI Innovative Picking Technologies, Inc. "Pick-MAX automated Picking system"; http://ipti.net/pickmaxauto.php; printed on Apr. 3, 2012 (1 Page).
IPTI Innovative Picking Technologies, Inc.; www.ipti.net; printed on Mar. 28, 2012 (1 page).
Levine, R.; "Wireless warehousing—using Proxim's Proxim RangeLAN2 wireless LAN/WAN system—Company Operations; FindArticles/Technology/Communications News"; Dec. 1999, 3 pages.
Raiyani, S. et al.; "Multimodal Warehouse Applications"; ACM, 2006, 3 pages.

* cited by examiner

WAREHOUSE MANAGEMENT SYSTEM

PRIORITY CLAIM

This application is a continuation-in-part (CIP) application of U.S. patent application Ser. No. 13/717,437, filed on Dec. 17, 2012, which claims the benefit of U.S. Provisional Application Ser. No. 61/577,979 filed on Dec. 20, 2011, the entire contents of both of which are incorporated herein by reference.

BACKGROUND

Retailers, wholesalers, rental services, and other product distributors (which may collectively be referred to as distributors) often maintain an inventory of various items that may be ordered by clients or customers.

Pickers can be given instructions to go to locations in inventory to pick items from specified locations. Pickers will sometimes utilize RF-connected wireless terminals or handheld scanners to receive instructions and to correctly pick the desired items. In addition, a picker may scan an item using the wireless terminals to ascertain whether the item is the desired item. In some instances, a mobile cart carrying multiple bins may be provided for the picker to use in picking items for an order. After an item has been picked, the picker can place the item in a desired bin, which may be used, for example, to keep separate orders organized, to keep similar items together, and so forth.

Conventionally, a picker may be instructed to pick items for one order at a time, or to pick items for a batch of orders going to a pick destination (e.g., to a particular automated sorting station, manual sorting station, packing station, or other processing station), or a list of items from various orders going to a particular destination, etc. After a picker picks the items, the picker may deliver the picked items to the pick destination, leaving the processing and sorting of the picked items into their individual orders to the other employees. The process may then be repeated for another list of items.

DETAILED DESCRIPTION

Figure 1:
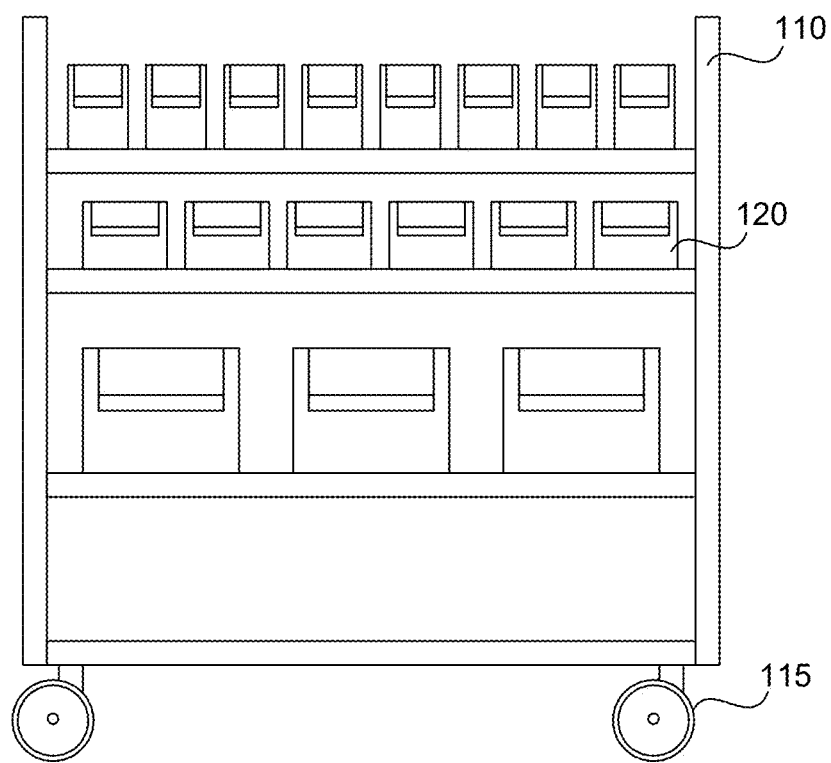
FIG. 1 is a front view of a conventional pick cart.

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

It is noted in the present disclosure that when describing the system, or the related devices or methods, individual or separate descriptions are considered applicable to one other, whether or not explicitly discussed in the context of a particular example or embodiment. For example, in discussing a warehouse management system per se, other device, system, and/or method embodiments are also included in such discussions, and vice versa.

Furthermore, various modifications and combinations can be derived from the present disclosure and illustrations, and as such, the following figures should not be considered limiting.

The present technology provides warehousing systems including mobile or stationary workstations, mobile device enclosures and mounting systems, software, communications and data display, including the ability to receive and display information from a variety of host sources, to interact with the data through touch, type or scan, and to return that data with pertinent changes to a host or middleware system.

Computer controlled order filling systems have been developed which assist workers in picking inventory order items. These order filling systems can identify the location and quantity of order items to be picked by a picker during the order filling process. These order filling systems may include a controlling computer or director computing device which may be electrically connected to numerous user interface devices mounted throughout a storage area. The user interface devices can include visual displays that direct the picker to the location of the order item and display the pick quantity of order items. After the specified quantity of the order item has been removed, the picker can confirm through the user interface that an inventory item has been picked. This process may be repeated until the worker has picked the items in the order. Existing warehouse management solutions are typically complex and provide a Graphical User Interface ("GUI") with limited user data interface and exchange capabilities. Further, the existing solutions are not able to maximize picking efficiency.

In one example of the present technology, a warehouse management system can include pick carts, each having an identifier associated therewith. A mobile computing device can be associated with a pick cart based on the identifier and may be associated with one of the pick carts at a time. A director computing device can be in wireless communication with the mobile computing device and can transmit pick instructions to the mobile computing device based on a currently associated pick cart configuration.

The present technology relates to a combination of a mobile cart or a work station and a computing device associable therewith. In one aspect, the computing device may be a touch screen tablet computing device. Other features, such as a tablet enclosure and mount, a graphical user interface application, and host connection to the director computing device may also be implemented to facilitate picking operations. This combination of technologies may provide a mobility enabled data interaction work station usable in a warehouse, storage center, or other storage environment that receives, stores or processes inventory.

Embodiments of the technology bring together disparate technologies to create an effective user experience of using vast amounts of data on warehouse floors without the need for a traditional desktop Personal Computer. This is accomplished using touch screen tablet computers or other such mobile devices, tablet enclosures, tablet mounts (static and swivel), user interface applications, user interface screens, host data connections, middleware processing and host side processing of data.

Referring to FIG. 1, a conventional pick cart 110 is illustrated for picking inventory items for filling an order. For example, the cart may include one or more shelves or surfaces for supporting bins 120 or containers thereon, or simply for supporting picked items placed thereon. Different shelves may support different sized bins for receiving larger quantities of items and/or for receiving physically larger items.

The pick cart can be mobile. As illustrated, the pick cart can include wheels 115 or another suitable mechanism for enabling a picker to move the cart from one location to another. Some pick carts may be motorized while others may be manually moveable upon application of a force by the picker.

Figure 2:
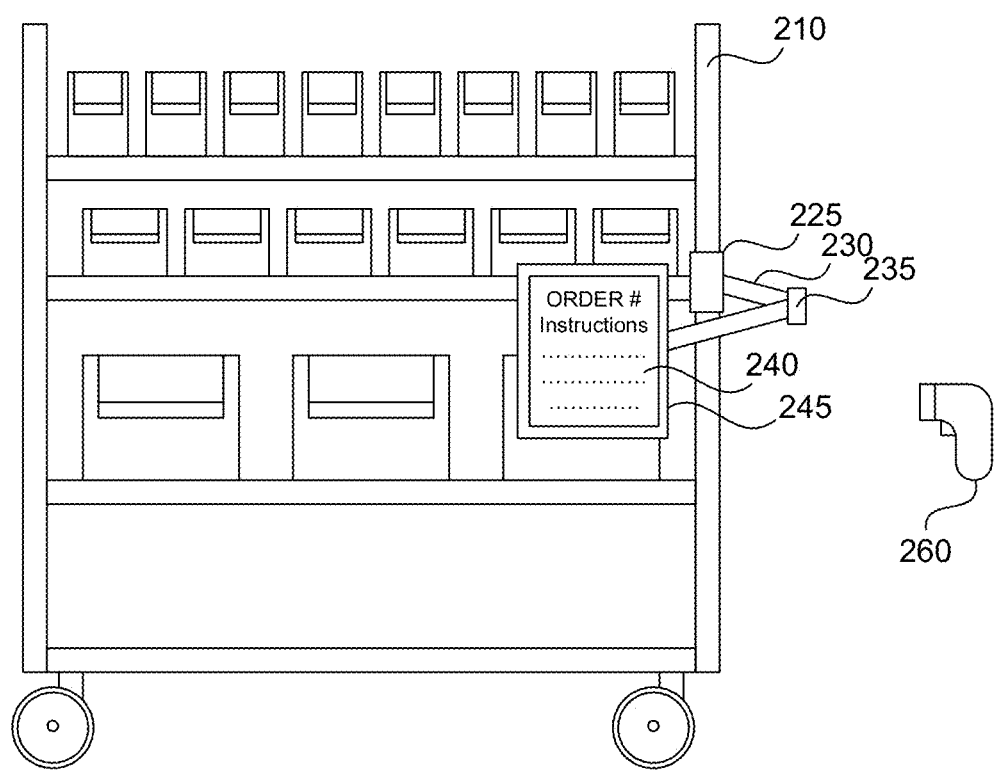
FIG. 2 is a front view of a pick cart with an attached mobile computing device in accordance with an example of the present technology.
Figure 3:
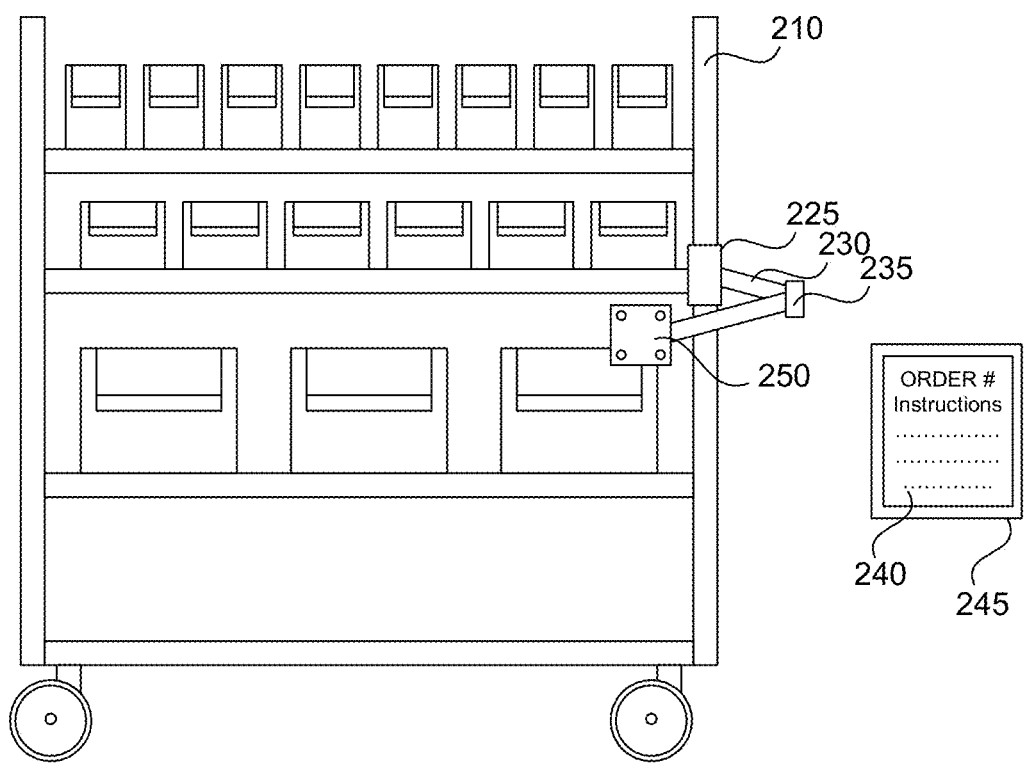
FIG. 3 is a front view of a pick cart with a detached mobile computing device in accordance with an example of the present technology.

Referring to FIGS. 2-3, a pick cart 210 is shown in accordance with another example, wherein the pick cart has a computing device 240 attached thereto, such as a tablet computing device. The computing device may be a mobile computing device, such as a phone, tablet, netbook, notebook, or other suitable device. The mobile device may be detachable from the pick cart or may remain unattached from the pick cart.

In one aspect, the technology is comprised of example components, such as: (i) a mobile pick cart 210 configured to hold inventory and/or provide a work surface and area for warehouse and/or manufacturing tasks, which, in one embodiment, has wheels; (ii) a touch screen computing device 240; (iii) an optional hand held scanner 260 such as a bar code scanner for scanning data (the function of the hand held scanner may optionally be performed by the computing device using, for example, an optical detector or camera of the computing device and software for performing the operations performed by the scanner in the past; (iv) an optional enclosure 245 for the computing device; and (v) an optional mount or bracket 250 (FIG. 3) for mounting the computer to the mobile cart or workstation.

Example implementations of the technology include various combinations of hardware. Such hardware can include, but is not limited to, tablet computers, swivel mounts, stationary mounts, mounts to posts, mounts to tables, pick carts, carts with shelves, work carts, table tops, forklifts, order pickers, man lifts, stock pickers, work stations, manifesting stations, value add work stations, receiving stations, and/or general warehouse vehicles. Designs of the technology include combinations of software, such as software suites, individual apps or applications, open connections to a host, specific connections to a host, middleware software and/or tablet-middleware connections.

Specific non-limiting device examples used by examples of the present technology can include tablet PC's/tablet computing devices 240 (e.g., iPads, Android tablets, Windows tablets, etc.), touchscreen computing devices, cell phone devices, BlueTooth scanners, Wi-Fi scanners, WMSs (Warehouse Management Systems), accounting systems, inventory systems, and so forth.

Examples of the present technology maintain the ability to perform calculations and data changes at device level using the computing device associated with the pick cart, as opposed to previous technologies that could simply display, capture, and/or return data—with little to no user side calculations possible. A warehouse management system according to the present technology may present large amounts of data, including text, tables and/or graphical data, to a user throughout a warehouse through the use of touch screen tablet computers, tablet enclosures, enclosure mounts, custom user interfaces, open data connections and appropriate host side data control.

The computing device 240 associable with the pick cart 210 can be attachable to a bracket 250 (FIG. 3) which may be coupled to the pick cart via a pivoting mechanical arm 230. The mechanical arm may include one or more hinges or pivot points 225, 235 to enable the arm to swivel, bend, extend, retract, fold, etc. Having a pivotable arm supporting the mobile computing device can enable a picker to pivot the mobile computing device to different positions to facilitate picking of items. For example, aisles between warehouse shelves may be narrow and maneuvering the cart into the aisle and/or within the aisle may be difficult or unfeasible. Having a pivot arm coupled to the mobile computing device enables the picker to position the cart to the side of an entrance to the aisle so that the picker can easily enter and exit the aisle, while positioning the mobile computing device such that the picker can view a display screen of the mobile computing device while in the aisle. Having the computing device attached to the pivot arm while picking can free the picker's hands and arms to carry or move items being picked or to use another handheld scanner 260 to verify that a picked item matches a pick instruction displayed on the computing device.

In one aspect, the pivot arm 230 may be rotatably coupled to a corner of the pick cart 210, such as to a vertical post forming a part of the pick cart frame, and may be rotatable around the vertical post within a range from adjacent to a shelf at the front of the pick cart, out and around from the pick cart, and back against a side of the pick cart. The pivot arm may also optionally be configured to pivot upward and downward, and may further be repositionable at different heights on the vertical post or from one position on the pick cart to another position (such as from one vertical post to another vertical post).

The computing device 240 may be housed in a frame 245 attachable to the bracket 250 (FIG. 3) at an end of the pivot arm 230. The bracket may be pivotable or movable with respect to the pivot arm across a wide range of motion in at least one plane (such as from a first orientation with the computing device parallel and adjacent to a first side of the pick arm to a second orientation with the computing device parallel and adjacent to a second, opposite side of the pick arm). The bracket may optionally be pivotable across all planes, such that the computing device may be pivoted upwardly, downwardly, sidewardly, or at an angle with respect to vertical or horizontal directions.

Any portion of the pivot arm 230 and/or bracket 250 may also optionally be rotatable, to enable for example, inversion of vertical orientation. The pivot arm can include one or more hinges between the ends thereof to enable further maneuvability and positionability of the pivot arm.

The mobile computing device 240 may be enclosed in an enclosure or frame 245 attachable to the bracket 250 which is configured to enable horizontal or vertical positioning of the mobile computing device. The enclosure may be configured to enable quick release from the bracket. In one aspect, the enclosure may be configured to attach to a variety of different types, shapes, or sizes of mounting brackets. The enclosure may further be configured to support one or more battery devices for powering the mobile computing device.

Mounting of a computing device to a mobile pick cart can include securing the device physically, securing access to device software, providing flexibility of orientation (e.g., portrait or landscape or other), providing extended battery life of standard devices, and/or providing a quick release for swapping of the computing device.

Software on the computing device 240 can allow display of batch pick information, allow a single item pick, allow order verification, allow order receipt, allow item putaway, allowing location cycle count, allow SKU cycle count, and allow order manifest. Displaying data with an interactive interface can include communication with a central hub (e.g., between a tablet and a data source), Bluetooth device communications (e.g., between a device and a tablet), localized calculations (e.g., at the tablet) which include error management, updating location data, and updating SKU data.

Figure 4:
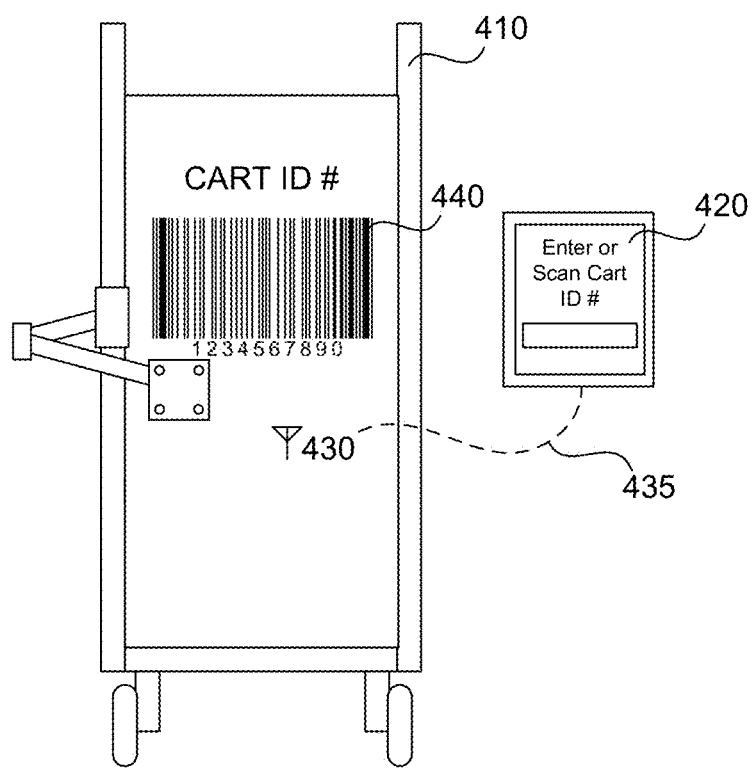
FIG. 4 is a side view of a pick cart and mobile computing device associable with the pick cart using a cart identification number or barcode in accordance with an example of the present technology.

Referring to FIG. 4, a system is shown in accordance with an example of the present technology, wherein one or more pick carts 410 may each have an identifier 440 associated therewith. A mobile computing device 420 can be associated with a pick cart based on the identifier and may be associated with one of the pick carts at a time. The mobile computing device can receive pick instructions based on a currently associated pick cart configuration.

The mobile computing device 420 can be selectively associated with or dissociated from the pick cart 410 based on the identifier 440 associated with the pick cart. The identifier may comprise any of a number of different types of identifiers. For example, the identifier may include a bar code, a UPC (Universal Product Code), a serial number, a QR (Quick Response) code, or any other suitable type of identifier. The association of the pick cart with the mobile computing device can be performed in a number of ways. For example, the mobile computing device may be configured to optically recognize the identifier with an optical detector (such as a camera, for example), such as by capturing an image of the identifier and using any of a number of currently available technologies for optically recognizing codes, characters or the like. As another example, a picker may manually enter a cart identification number into the mobile computing device using an identifier input interface implemented in software on the mobile computing device.

In another example, the mobile computing device 420 may be configured to detect a wireless signal from an emitter 430 on the pick cart, such as a BlueTooth, Wi-Fi, RF (Radio Frequency), NFC (Near Field Communication), or other wireless signal. The mobile computing device may include an appropriate detector for detecting the type of signal emitted from an emitter on the mobile cart. The mobile computing device may also detect the signal from the pick cart as a signal transmitted over a wired connection between the pick cart and the mobile computing device. For example, a data cable 435 or other wired connection may extend from an identifier device on the pick cart and be insertable into an appropriate data port on the mobile computing device.

In one example, the mobile computing device 420 can be used to capture an image of the pick cart, including a configuration of the cart (such as a number and/or arrangement of any shelves, bins, and so forth), and can identify or retrieve a cart identifier based on the detected pick cart configuration.

Figure 5:
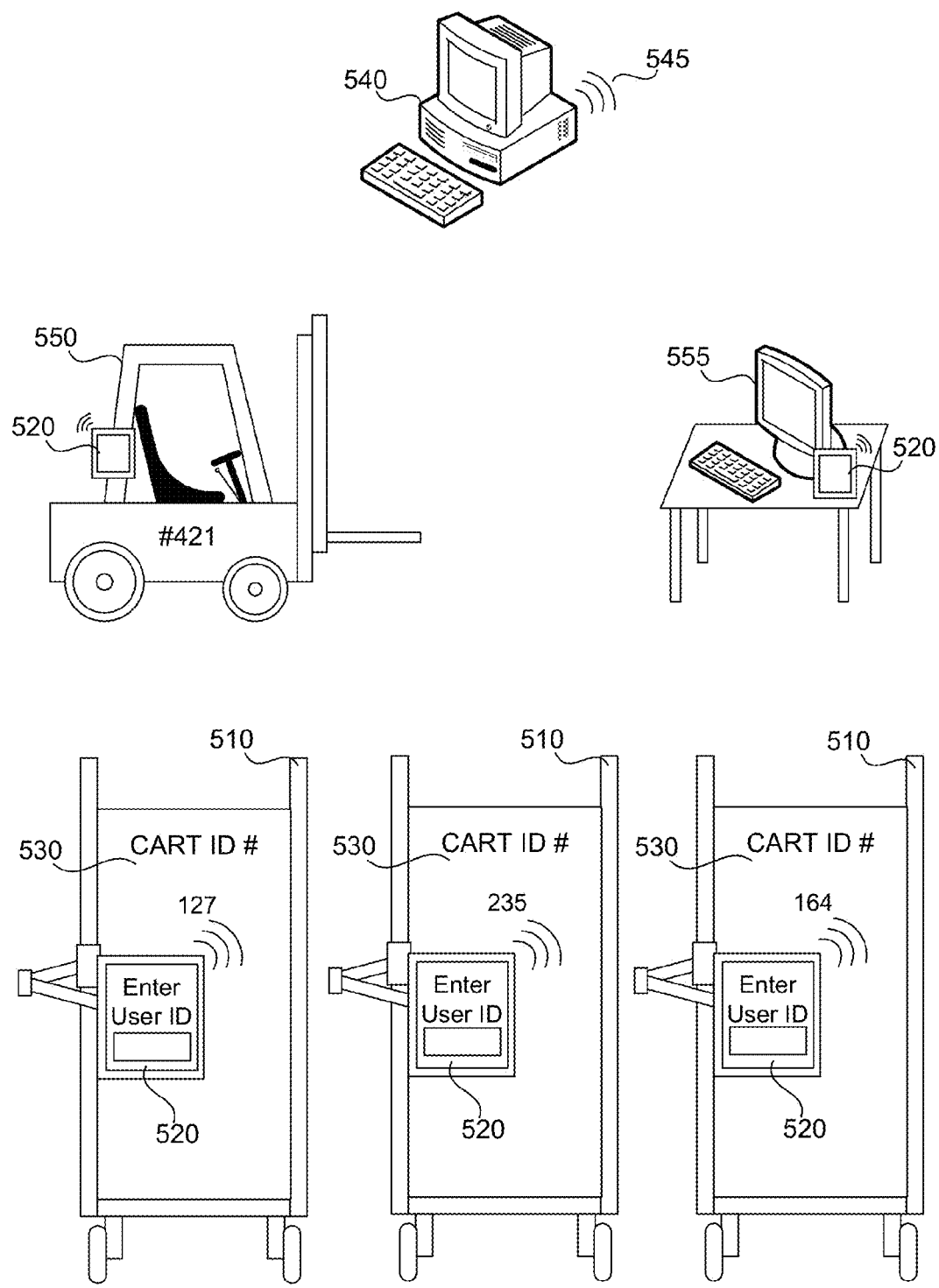
FIG. 5 illustrates a warehouse management system including a director computing device and a plurality of pick carts having mobile computing devices associated therewith in accordance with an example of the present technology.

Reference will now be made to FIG. 5. Each pick cart 510 may have a known configuration, including for example, a number and size of bins, a number of shelves, a height between shelves, a shelf depth, a maximum recommended load capacity, and so forth. The configuration of the pick carts can be associated with an identification 530 of the pick cart, such as an identification number, barcode, etc. The pick cart identifications and configurations can be stored in a cart profile data store accessible by a director computing device 540. The director computing device may provide an interface by which new carts/configurations may be input, by which current carts/configurations may be modified, and by which current carts/configurations may be removed from the system.

Positive identification of a pick cart 510 can enable better planning for picking particular items. For example, a large, heavy-duty cart may be desired for picking large items or a large number of items. Some carts may have different heights, widths, or depths which are better suited to picking particular items, or to entering aisles on which items are located. The director computing device 540 can thus use a variety of information specific to the pick cart and the items to be picked to determine the appropriate pick cart to use for a specific picking task. As another example, the director computing device may assign items to be picked based on a current association between a pick cart and mobile computing device. Cart configurations may be dynamic. In other words, pickers may be enabled to change a cart configuration. In some examples, the director computing device may include instructions to the picker to change the cart configuration in a defined manner before completing pick instructions.

As stated previously, the mobile computing device 520 can be in wireless communication 545 with the director computing device 540 and can receive pick instructions from the director computing device. The pick instructions may be assigned and/or transmitted to mobile computing devices 520 manually or automatically, such as according to predefined assignment rules. Association of the mobile computing device with a specific cart having a known configuration can assist in the flow of instructions from the director computing device because the director computing device can "know" which carts are in use, which are available for association with a mobile computing device, and so forth. GPS or other positional sensing sensors can further be used to submit data to the director computing device so that the director computing device is "aware" of a position of the mobile computing device(s) and/or pick cart(s) at any given time. The positional data can also be used in organizing pick instructions to be sent to pickers. Furthermore, the director computing device can "know" where inventory is, such as what inventory items are on the cart and/or where the cart is located due to the association of the mobile computing device with the cart. When an item is picked and placed on the cart, the user may input completion of the pick into the computing device to enable tracking of the location of the inventory by the director computing device. Also, this may enable the director computing device to query what inventory items are currently on or located with any given pick cart.

As one example use case, a mobile computing device 520 may be associated with a pick cart 510 having a pick cart configuration. The director computing device 540 can transmit pick instructions to the mobile computing device based on the configuration of the currently associated pick cart. Any items to be picked which are incompatible with the pick cart or the picker, due to size, security, or other reasons, may be included in instructions sent to a different mobile device. For example, pick instructions for high security items may be assigned to specific pickers, such as by sending the pick instructions to the mobile computing device 520 associated with the specific picker(s) after identifying the association according to user login information, mobile computing device identification, or the like.

As another example use case, a mobile computing device 520 may be associated with a pick cart 510 having a pick cart configuration. The director computing device 540 can transmit pick instructions to the mobile computing device for the picker to dissociate the mobile computing device from the currently associated pick cart and to re-associate the mobile computing device with a different pick cart, which may be identified by configuration characteristics, explicit identification, and so forth. After re-association with the different pick cart, the picker may proceed to complete pick instructions received from the director computing device. In some examples, multiple carts may have same or similar configurations. If the multiple carts are the same or if the specific configuration of the cart is not important for completing pick instructions, the picker may be enabled to select a different cart independently for completing pick instructions. The association of the picker's mobile computing device with the different cart may indicate to the director computing device that the different cart is to be used to complete the pick instructions.

In another example, picker profile information may be stored in a picker profile data store accessible by the director computing device 540. Picker profile information may include, for example, security clearance, experience, physical stature, and so forth. A picker can log-in to a mobile computing device to be associated with the mobile computing device. Rather than simply distributing pick instructions to mobile devices 520 based on pick cart configurations, the director computing device may further consider picker profile information. For example, if particular items are accessible to pickers with a specific security clearance, pick instructions may be sent to mobile computing devices associated with pickers with the specified security clearance. If items are fragile or otherwise involve particular handling for picking, pickers with a certification or minimal level of experience may receive the picking instructions for such items. If items are located high on a shelf or are above a certain weight, pickers with a minimum height or build may be selected to pick such items.

In one aspect, additional devices may be associated with the mobile computing device 520. For example, a handheld scanning device may be in wireless communication with the director computing device but not currently in direct communication with the mobile computing device. A picker may associate the handheld scanning device with the mobile computing device such that any scanning or other functions performed by the scanning device can be reported to the director computing device 540 and then to the mobile computing device with which the scanning device is associated. Thus, the mobile computing device can confirm to the picker the accuracy of functions performed using the scanning device. The association of the scanning device with the mobile computing device can be performed in a similar fashion as the association of the mobile computing device with the pick cart. In some examples, the scanning device may communicate directly with the mobile computing device.

In one aspect, the mobile computing device 520 may be used as a scanning device in place of traditional handheld scanning devices. A camera, optical detection device, RF detection device, or the like included with the mobile computing device may perform the functions conventionally performed by handheld scanning devices.

Picking instructions may, in some examples, include instructions to use multiple pick carts 510 to pick various items. Thus, a picker may be instructed to pick some items using a first cart and then to switch to another cart to continue picking items. In such an example, currently displayed instructions for the picker may include instructions for the currently associated pick cart or pick cart configuration. Once the instructions for the currently associated pick cart have been completed, the mobile computing device may display instructions for the next pick cart.

The mobile computing device 520 may provide a distal picker mode and a proximal picker mode. For example, in a distal picker mode, the mobile computing device may be configured to display a location and/or item name or number in large text, filling a majority of the display screen, to enable the picker to view the instructions from a distance while picking items and the mobile computing device is attached to the pick cart. Use of a handheld scanner can trigger a change of what is displayed on the mobile computing device. For example, a signal to the mobile computing device may be provided that the handheld scanner indicates the picker has picked the currently displayed item. In a proximal picker mode, smaller text may be provided to display a more complete instruction—such as displaying multiple of the items to be picked or displaying additional information about the current item to be picked. Some information which may be included on the display in the distal or proximal picker modes may include, for example, detailed item information, including graphics, video, drawing and related documentation; warehouse locations; warehouse work stations; warehouse users; picking steps, including graphical instructions, video instructions and/or related documentation; a count of available items; options to update item information/location; tracking information regarding inventory status during a picking process; and/or any user activity during one or more of a receiving process, a put away process, a picking process, a cycle count process, and/or an inventory control process.

In one example, a method of use of the present system may include steps such as: identifying an item, verifying an item, showing details of an item, and/or updating an inventory. When the picker is instructed to perform a put-away option or stocking option for returning an item to a specific location, the method may include one or more of: directing a picker to a location, verifying a location, and/or updating inventory at a location. The picking process may include one or more of: directing a picker to a location, verifying a location, verifying an item, verifying a pick quantity, updating a location quantity, and/or updating a pick task list.

In one aspect, the mobile computing device 520 may track a particular bin on the cart where items are stored, such as by providing instructions to the picker to place the item in the bin and then requesting confirmation that the item has been placed in the instructed bin.

Portions of the systems and methods described herein may be implemented as computer readable program code executed by the processor, the computer readable code being embodied on a non-transitory computer usable medium.

In some examples, the system may be implemented in connection with devices other than pick carts. For example, the mobile computing device 520 may be associable with a forklift 550, a work station 555, man lifts, stock pickers, manifesting stations, value add work stations, receiving stations, general warehouse vehicles and any variety of other types of devices.

Figure 6:
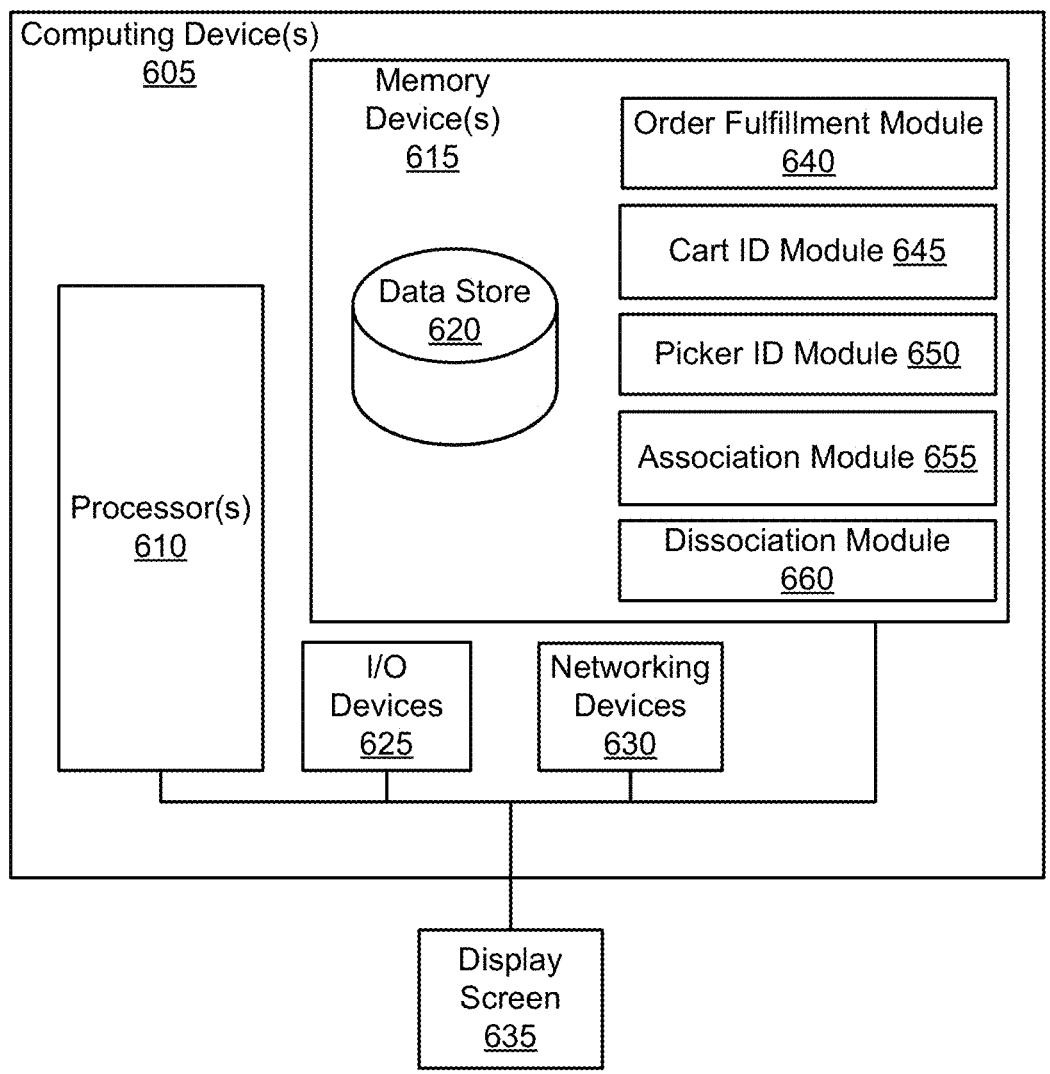
FIGS. 6-7 illustrate warehouse management systems involving computing devices, modules, and data stores in accordance with examples of the present technology.

Referring to FIG. 6, a warehouse management system is shown in accordance with an example of the present technology. FIG. 6 illustrates that a device 605 may be a computing device or computing node that includes hardware processor devices 610, hardware memory devices 615 and Input/Output (I/O) device 620 communication to enable communication between hardware devices and I/O components. Networking devices 625 may also be provided for communication across a network with other nodes of the technology. The network device may provide wired or wireless networking access for the networkable devices. Examples of wireless access may include cell phone network access, Wi-Fi access or similar data network access.

FIG. 6 also illustrates a computing device 605 on which modules 640, 645, 650, 655, 660 of the present technology may execute. The computing device may include one or more processors 610 that are in communication with the memory devices 615. The computing device may include a local communication interface for the components in the computing device. For example, the local communication interface may be a local data bus and/or any related address or control busses as may be desired.

The memory device 615 may contain modules that are executable by the processor(s) 610 and data for the modules. Located in the memory device are modules executable by the processor. For example, the modules may include an order fulfillment module 640 for tracking and organizing order fulfillment processes; a cart ID module 645 for maintaining a database of cart IDs and configurations for identifying a cart when a cart ID is received or detected; a picker ID module 650 for identifying a picker according to an identification number, login, information, or the like for associating the picker with a cart and/or mobile computing device for picking instructions; an association module 655 for associating a mobile computing device with a pick cart and/or for managing or storing information related to associations of mobile computing devices with pick carts; and a dissociation module 660 for dissociating a mobile computing device from a pick cart and/or for editing or removing stored information related to associations of mobile computing devices with pick carts. Other modules may also be present and may, for example, be located in the memory device 615. The modules may execute the functions described earlier. A data store 620 for storing orders, warehouse inventory and other data may also be located in the memory device for storing data related to the modules and other applications along with an operating system that is executable by the processor(s) 610.

Other applications may also be stored in the memory device 615 and may be executable by the processor(s) 610. Components or modules discussed in this description that may be implemented in the form of software using high programming level languages that are compiled, interpreted or executed using a hybrid of the methods.

The computing device may also have access to I/O (input/output) devices 620 that are usable by the computing devices. An example of an I/O device is a display screen 630 that is available to display output from the computing devices 605. Other known I/O device may be used with the computing device as desired. The networking devices may be wired or wireless networking devices that connect to the internet, a LAN, WAN or other computing network.

The components or modules that are shown as being stored in the memory device 615 may be executed by the processor 610. The term "executable" may mean a program file that is in a form that may be executed by a processor. For example, a program in a higher level language may be compiled into machine code in a format that may be loaded into a random access portion of the memory device and executed by the processor, or source code may be loaded by another executable program and interpreted to generate instructions in a random access portion of the memory to be executed by a processor. The executable program may be stored in any portion or component of the memory device. For example, the memory device may be random access memory (RAM), read only memory (ROM), flash memory, a solid state drive, memory card, a hard drive, optical disk, floppy disk, magnetic tape or any other memory components.

The processor 610 may represent multiple processors and the memory 615 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer and similar systems.

Figure 7:
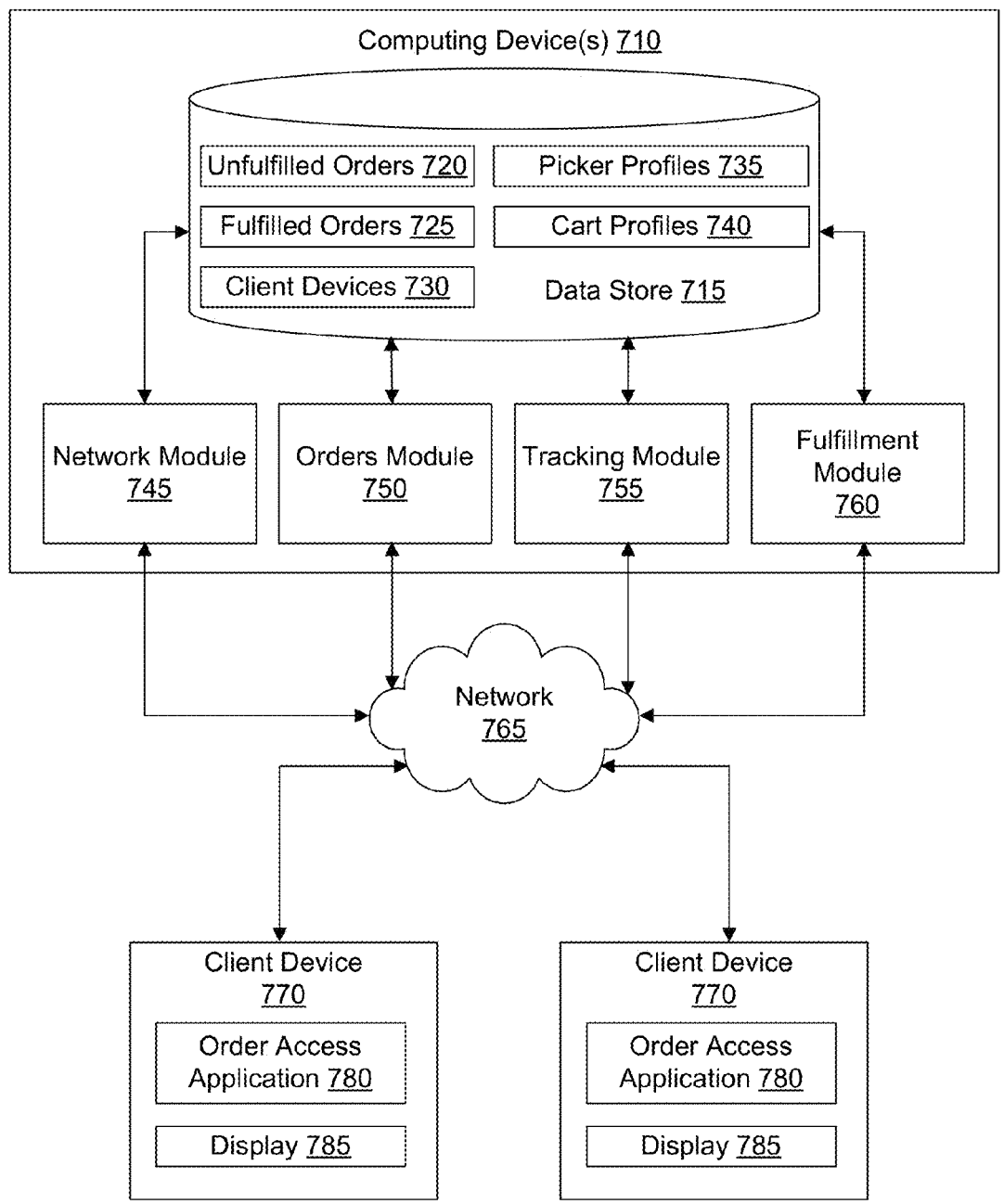

FIG. 7 illustrates another example implementation of the present technology. A warehouse management system may be implemented across multiple computing devices, such as computing device 710 and client device 770 connected via a network 765. For example, a computing device 710 may include a data store 715 and various modules 745, 750, 755, 760 executable by a processor of the computing device 710 for performing various aspects of the present technology. Some examples of the modules may include a network module 745, an orders module 750, a tracking module 755, and a fulfillment module 760.

The data stored in the data store 715 may include, for example, unfulfilled order data 720, fulfilled order data 725, client device data 730 such as identification and/or device information for mobile computing devices 770, picker profile information 735, cart profile information 740, and so forth. The term "data store" may refer to any device or combination of devices capable of storing, accessing, organizing and/or retrieving data, which may include any combination and number of data servers, relational databases, object oriented databases, simple web storage systems, data storage devices, data warehouses, flat files and data storage configuration in any centralized, distributed or clustered environment. The storage system components of the data store may include storage systems such as a SAN (Storage Area Network), cloud storage network, volatile or non-volatile RAM (Random Access Memory), optical media or hard-drive type media.

The network module 745 may provide for communication of data in the data store 715 between the computing device 710 and the client devices 770. The orders module may facilitate management of data in the data store relating to orders, such as by updating unfulfilled orders 720 and fulfilled orders 725 information. The tracking module 755 can track the status of orders or the picking process and may be configured to provide a report regarding the status. The fulfillment module 760 can manage issuance of picking instructions to fulfill unfulfilled orders, and instructions may be based on one or more of picker profile information, cart profile information, associations between client devices 770 and carts or pickers, and so forth.

The client devices 770 are representative of a plurality of client devices that may be coupled to the network 765. Each client device 770 may comprise, for example, a processor based system such as a computer system. Such a computer system may be embodied in the form of a client computer, a desktop computer, a laptop computer, a mobile device, a hand held messaging device, a set-top box, heads up display (HUD) glasses, a car navigation system, personal digital assistants, cellular telephones, smartphones, set-top boxes, network-enabled televisions, music players, web pads, tablet computer systems, game consoles, electronic book readers or other devices with like capability, including capabilities of receiving and presenting content from a server. Each client device 770 may include a respective display 785. The display 785 may comprise, for example, one or more devices such as cathode ray tubes (CRTs), liquid crystal display (LCD) screens, gas plasma based flat panel displays, LCD projectors, or other types of display devices, etc.

A client device 770 may be configured to execute various applications such as a browser 775 and/or a page or content access application 780 for displaying pick instructions and/or data for useful applications. The browser 775 may be executed by a client device 770, for example, to access and render network pages, such as web pages, or other network content served up by the computing device 710 and/or other servers. The content access application 780 is executed to obtain and render for display content features from the server or computing device 710, or other services and/or local storage media.

In some embodiments, the content access application 780 may correspond to code that is executed in the browser 775 or plug-ins to the browser 775. In other embodiments, the content access application 780 may correspond to a standalone application, such as a mobile or desktop application. The client device 770 may be configured to execute applications beyond those mentioned above, such as, for example, mobile applications, email applications, instant message applications, and/or other applications.

Although a specific structure may be described herein that defines server-side roles (e.g., of content delivery service) and client-side roles (e.g., of the content access application), it is understood that various functions may be performed at the server side or the client side.

Next, a general description of the operation of the various components of the networked environment is provided. Pickers at client device 770 access content features through the client device 770 or through content access applications 780 executed in the client device 770. The client device 770 may communicate with a server or director computing device 710 over any appropriate network 765, including an intranet, the Internet, a cellular network, a local area network (LAN), a wide area network (WAN), a wireless data network, or a similar network or combination of networks.

Certain processing modules have been discussed in connection with this technology. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The modules that have been described may be stored on, accessed by, accessed through, or executed by a computing device 710. The computing device 710 may comprise, for example, a server computer or any other system providing computing capability. Alternatively, a plurality of computing devices 710 may be employed that are arranged, for example, in one or more server banks, blade racks or other arrangements. For example, a plurality of computing devices 710 together may comprise a cloud computing resource, a grid computing resource, and/or any other distributed computing arrangement. Such computing devices may be located in a single installation or may be distributed among many different geographical locations. For purposes of convenience, the computing device 710 is referred to herein in the singular form. Even though the computing device is referred to in the singular form, however, it is understood that a plurality of computing devices 710 may be employed in the various arrangements described above.

Various applications and/or other functionality may be executed in the computing device 710 according to various embodiments, which applications and/or functionality may be represented at least in part by the modules that have been described. Also, various data is stored in a data store 715 that is accessible to the computing device 710. The data store 715 may be representative of a plurality of data stores as may be appreciated. The data stored in the data store 715, for example, is associated with the operation of the various applications and/or functional entities described. The components executed on the computing device 710 may include the modules described, as well as various other applications, services, processes, systems, engines, or functionality not discussed in detail herein.

In some examples picking options included in a graphical user interface on the mobile computing device may be enabled or disabled based on user identification, pick assignments, association with different picking devices and so forth. For example, where a particular assignment or user identification indicates that the user is to verify accuracy of completed pick instructions, the mobile computing device may be associated with a work station, such as a desk, packaging location, personal computer location, and so forth. In this example, options for verifying the accuracy of the completion of the pick instructions may be presented to the user. In another example where an assignment or user identification indicates that the user is to complete a slotting task, the user may be enabled to associate the mobile computing device with a forklift but not a pick cart, work station or other pick-related device, and options on the mobile computing device may be presented for completing slotting tasks, while other tasks for picking, verifying, and so forth may be disabled and/or made invisible or otherwise unavailable to the user. A user login option may also enable the user to define which tasks or options will be available to the user.

While the foregoing description refers to use of mobile computing devices primarily in terms of association with pick carts, the mobile computing device may more broadly be used with any of a variety of pick platforms. Some examples of other pick platforms include the pick devices described above, such as forklifts, work stations and so forth.

Figure 8:
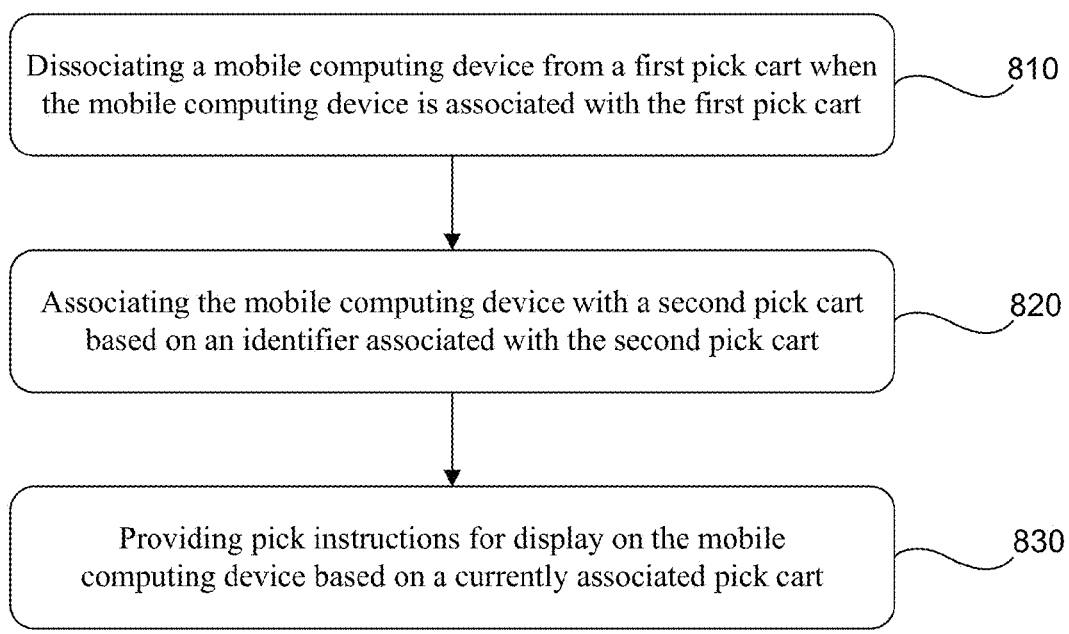
FIG. 8 is a flow diagram of a warehouse management method in accordance with an example of the present technology.

Referring to FIG. 8, a flow diagram of a warehouse management method using a plurality of pick carts is illustrated in accordance with an example of the present technology. The method can include dissociating 810 a mobile computing device from a first pick cart when the mobile computing device is associated with the first pick cart. The mobile computing device can be associated 820 with a second pick cart based on an identifier associated with the second pick cart and pick instructions may be provided 830 for display on the mobile computing device based on a currently associated pick cart configuration.

The method can include physically removing the mobile computing device from the first pick cart and physically positioning the mobile computing device with the second pick cart. The method can also include: identifying a user of the mobile computing device (i.e., the picker) and determining the pick instructions based on the user; and/or identifying a configuration of the currently associated pick cart and determining the pick instructions based on the configuration.

In one aspect, providing the pick instructions for display may provide the pick instructions for fulfilling an individual order using associations of the mobile computing device with multiple of the plurality of pick carts based on identifiers associated with the multiple pick carts.

Figure 9:
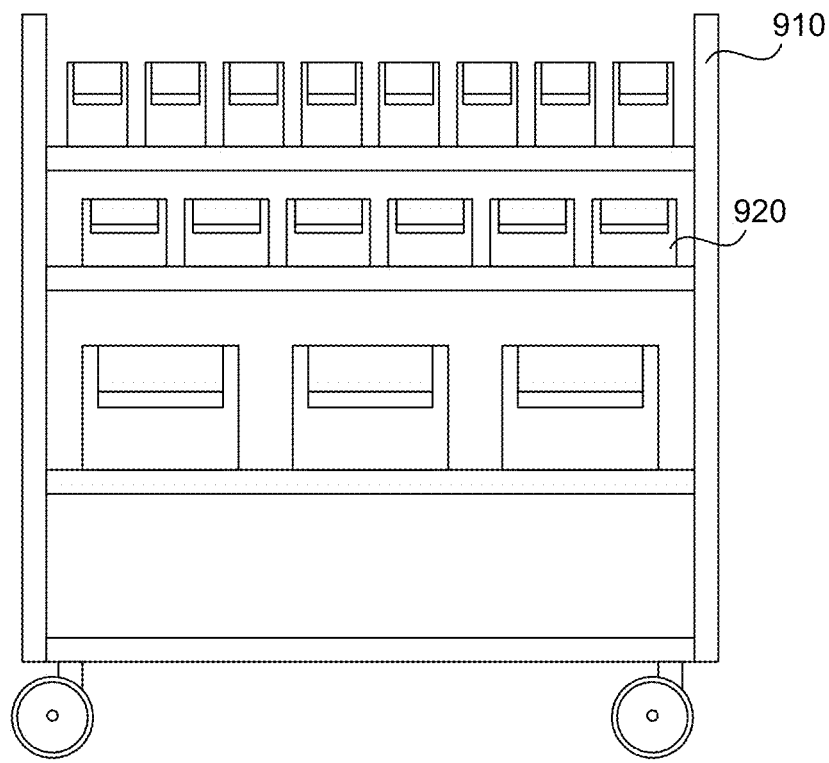
FIG. 9 is a view of a pick platform configuration corresponding to a pick platform profile map on a mobile computing device in accordance with an example of the present technology.
Figure 9:
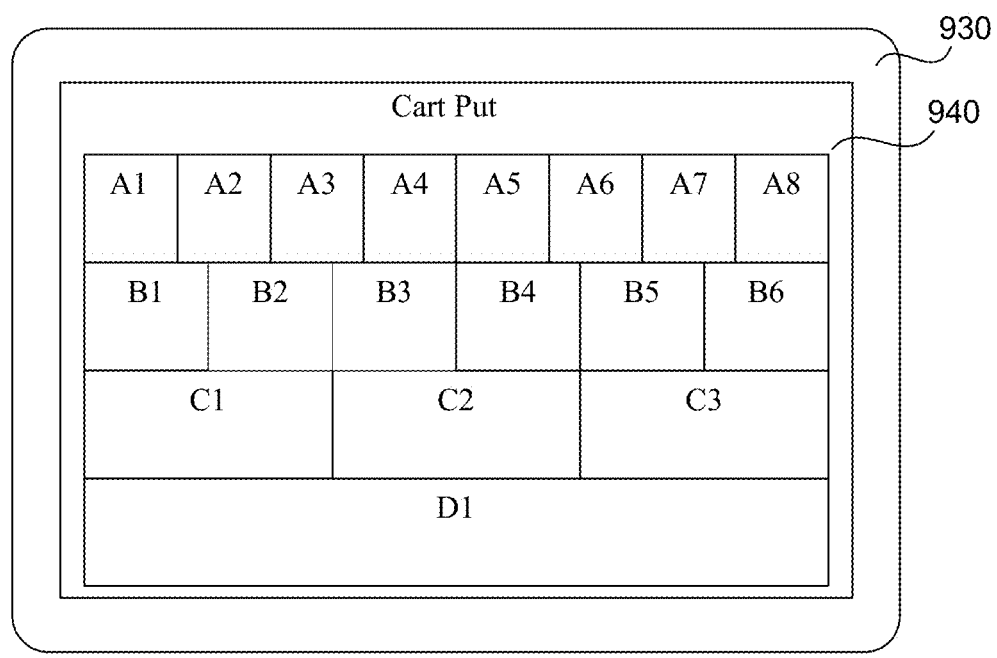

Reference will now be made to FIG. 9. FIG. 9 illustrates a pick cart 910 with various bins 920 or containers arranged thereon and a mobile computing device 930 (i.e., FIG. 9 illustrates a tablet) with a graphical user interface corresponding to the arrangement of the bins on the pick cart. The warehouse management system may include or be operable with a director computing device as has been described previously. The pick cart may be one of any number of available pick platforms, which may include pick carts, forklifts, work stations and so forth. Each of the pick platforms may have a platform profile associated therewith. The platform profile may include the configuration, presence or arrangement of bins on the pick platform.

The warehouse management system may include a data store to store the platform profile for each of the plurality of pick platforms. As has been discussed, the platform profiles may be used in determining picking assignments. For example, orders may be grouped based on a determination that a particular pick platform is suitable for use in picking each of the items for the orders to be grouped. Factors considered in determining the suitability may include the number of bins on the cart, the size of the bins on the cart, the arrangement of the bins on the cart, the size of the cart, the size of items to be picked, the number of items to be picked, the weight of items to be picked and so forth. Factors relating to the bins or the cart may be included in the platform profile while factors relating to the items to be picked may be associated with the respective item identifications in an item data store.

The mobile computing device may be capable of being and configured to be associated with a pick platform. The mobile computing device may retrieve the platform profile from the data store for the pick platform upon association with the pick platform. The platform profile retrieved by the mobile computing device may, for example, include information about the bins on the cart, including a number, size, type, etc.

The mobile computing device may generate a graphical user interface 940 based on the received platform profile. As illustrated in FIG. 9, the graphical user interface 940 may include rows or columns corresponding to rows or columns of bins 920 and/or shelves on the pick cart 910 and may identify each of the bins on the cart. The user may optionally be prompted to confirm that the platform profile displayed on the mobile computing device corresponds to the actual configuration of the pick cart with which the mobile computing device has been associated. If the displayed platform profile differs from the physical configuration of the pick cart, then the user may indicate that the displayed profile is incorrect and/or modify the displayed platform profile to match the actual physical configuration. When the platform profile is incorrect or is modified, the mobile computing device may notify the director computing device and the director computing device may determine whether to persist with an assignment of pick instructions in light of the discrepancy when the pick instructions were previously determined to be fulfilled by a picker associated with the particular pick cart. In another example, the pick instructions may not be assigned until after the cart configuration is confirmed to ensure that assignment of pick instructions to the particular pick cart is appropriate. In other words, the director computing device may determine the pick instructions based on the platform profile and may optionally update or modify the pick instructions if the platform profile is modified subsequent to assignment of the pick instructions.

The pick instructions may include pick instructions for picking one or more orders to the pick platform. The pick instructions may be interpreted by the mobile computing device in light of the platform profile. For example, the pick instructions may specify a particular bin into which a particular item is to be put after picking the item from a shelf. The mobile computing device may identify the bin into which the item is to be put and may highlight a box on the interface corresponding to the bin. In other words, the mobile computing device may include, function as, or execute a highlight module to graphically display the platform profile and to highlight a location on a map of the platform profile to which an item included in the plurality of orders is to be picked. The map, or platform profile map, may represent a number of bins, arrangement of bins, size of bins, and so forth corresponding to the bins on the pick platform with which the mobile computing device is associated. As may be appreciated, different of the pick platforms may have different platform profiles representing different arrangements of bins, numbers of shelves on pick carts and so forth.

Figure 10:
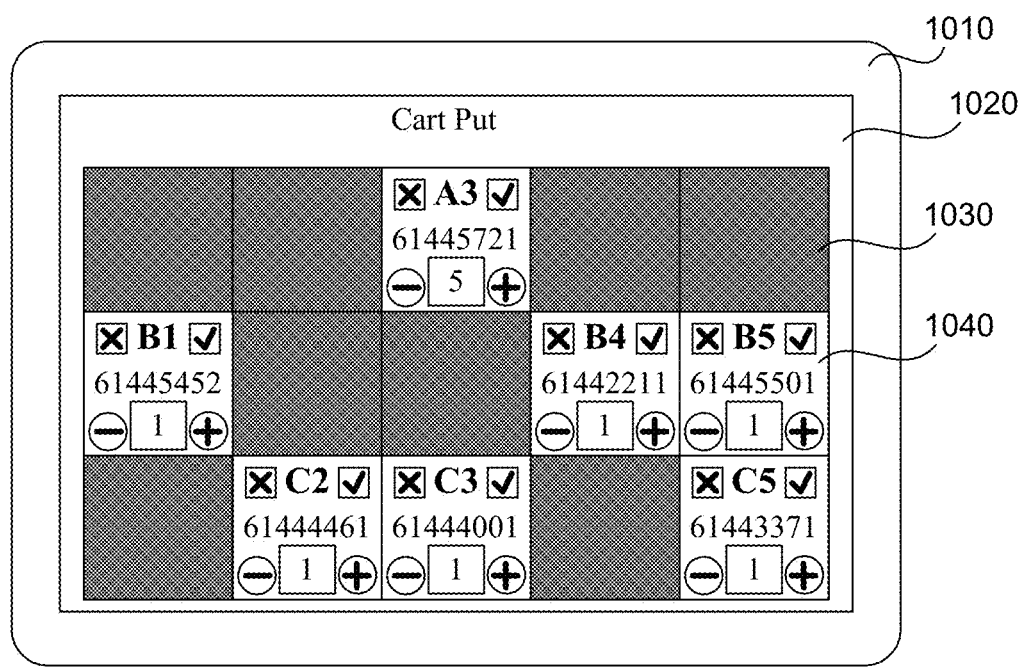
FIG. 10 is graphical user interface on a mobile computing device for use in picking items to a pick platform in accordance with an example of the present technology.

Referring to FIG. 10, for example, a simplified platform profile or platform profile map 1020 is displayed on a mobile computing device 1010. In this example, a pick platform may be configured with three rows of bins, five across. When the mobile computing device receives pick instructions, the mobile computing device may display the boxes on the pick platform interface corresponding to the bins on the pick platform for which items are to be picked. The mobile computing device may display a pick platform map as in FIG. 10 as the instructions or may display the instructions before displaying the pick platform map or may provide the instructions via another device, such as a barcode scanner for example. Some implementations of these examples are described below.

The mobile computing device may receive pick instructions and the user may indicate readiness to begin picking. The pick platform map may then be displayed highlighting a location of bins into which items are to be put and a number of items to put in each bin. The pick platform map may associate each of the bins with an order and may display the order number on the box corresponding to the bins. When the user has picked the items for the orders and put the items in the bins, the check box may be selected to indicate that picking of the item for that order has been completed. If the order is not completed, such as if there are insufficient items to put into the bin or if the user has insufficient time to complete the picking operation at that time, then the user may select the 'x' box to indicate that picking of the item for that order is incomplete.

Marking picking of an item as incomplete may represent that no quantity of an item has been placed in the bin for the order or may represent that less than a full quantity of the items has been placed in the bin. Controls for indicating a picked quantity are described in further detail below. In some examples, the 'x' may be used when no quantity is put in the bin and for partial picks the quantity controls may be manipulated to indicate the picked quantity that is less than the order quantity. The mobile computing device may thus include a partial pick module to enable partial completion of at least one of the orders. The partial pick module may enable resuming of partially picked orders, such as after additional quantity has been stocked on the shelves or after the user has moved to another location in the warehouse where additional quantities of the item are stocked.

In one example, rather than using the 'x' box to indicate incompletion of an order, because incompletion may be optionally identifiable through the quantity controls discussed below, the 'x' box may be used to indicate that the picked quantity to be placed in the bin has been placed somewhere other than the bin. For example, FIG. 9 illustrated an open shelf at D1, which may represent an overflow for the pick cart. If the items picked for an order do not fit in the bin or there is some other reason for not placing the items in the bin, the user may select the 'x' box to indicate that the items have been placed in the overflow on the pick platform. The mobile computing device may enable and track the placement of items in the overflow location using an overflow module, where the overflow location is different than the highlighted location of the bin.

The pick platform map may further include controls to indicate a quantity or to change a quantity, such as the plus and minus signs illustrated in FIG. 10. One example use of these is to decrement a displayed number by one for every individual item picked and placed into the bin. When the counter reaches zero, the number of items to be put in the bin for the order is complete and the check box may be selected. A number remaining on the counter above '0' when the 'x' box is selected to indicate an incomplete order may be noted in the system to be completed at another time. Another example use of the quantity controls on the pick platform map may be to increment the counter by one for every individual item put into the bins. The scanner device, for example, may indicate a number to be put into the bins and the user may put the indicated number in the bins and note the number on the pick platform map counter. As another example, rather than displaying the number on the scanner device, the pick platform map may indicate the number as X/Y, where x is the number of items put in the bin and Y is the number of items to be put in the bin. For example, where 5 items are to be put in a bin, the counter may start at 0/5 and be incremented for each item up until 5/5, at which time the picking of that item for that bin may be complete. In one example, a coloration of the box or a portion of the box on the pick platform map corresponding to the bin may be modified based on completion of the putting a sufficient number of an item into a bin. For example, a white background may turn green when the appropriate number of items has been put into the bin. As another example, once sufficient items have been placed into a bin and the quantity on the platform profile map has been updated, the box corresponding to the bin may be grayed out, have controls disabled, and/or otherwise become similar to other boxes that did not receive a quantity of the item because the item was not in orders corresponding to the boxes. In this way, the user may quickly view which bins are still targeted for additional items and not be distracted by boxes for which item picking has been completed.

FIG. 10 illustrates that some of the boxes on the pick platform map corresponding to the bins are greyed out or otherwise provided in a diminished or reduced visibility view. In one example, a color of some of the bins may differ from others. Such distinctions may function as a highlight to highlight bins (see highlighted bin 1040) into which items are to be put or to inversely highlight bins from which items are to be omitted or not put. In the example of FIG. 10, a user may quickly ascertain that the boxes with the white background correspond to bins into which items are to be put and the grayed out boxes 1030 correspond to bins into which items are not to be put. In alternative or cumulative configurations, quantity controls, number of items to be picked and so forth may be enabled, disabled, provided, hidden, etc. for specific boxes based on whether an item is to be put into a particular bin. In FIG. 10, the boxes for bins not receiving the current item are greyed out and lack controls or other interface options present in the boxes for bins into which the current item is to be put.

The boxes highlighted for putting items may vary as picking progresses. For example, when a first item is scanned or otherwise identified to be picked for putting in the bins, boxes corresponding to bins into which the item is to be placed may be highlighted. The other boxes may be grayed out or otherwise demarcated from the highlighted boxes. When a second item is scanned or otherwise identified to be picked for putting in the bins, the boxes corresponding to bins into which the item is to be placed may be highlighted, which may be different than the boxes for the first item, depending on which orders included the item (where each bin corresponds to a different purchase order in this example).

In one example, the mobile computing device may display the item to be picked, optionally including any useful information, some examples of which may include item number, item description, location(s) of the item, quantity of the item at each location, photograph of the item, barcode, total quantity to be picked, and so forth. The user may view the displayed item and move the pick cart to a location convenient for picking the item from a shelf or other location. The user may use a scanner device to scan the item when picked from the shelf and the mobile computing device display may switch to the pick platform map display to further inform the user regarding where to put the items picked. Once the user has completed picking the items (whether sufficient of the items are available for the orders or not), the mobile computing device may then display item information for the next item to be picked.

In one example, the item information displayed may be the photograph or another image of the item, as mentioned above. The pick instructions transmitted from the director computing device may include the photograph or the photograph may be stored at or otherwise accessible from the mobile computing device (such as over a network). The photograph may be displayed as the item to pick and/or may be displayed in each of the boxes of the pick platform map.

It is noted that with regard to the configurations illustrated in FIGS. 9-10 and other figures in this disclosure that the configurations may be varied or modified in any number of ways to suit a particular application. As non-limiting example modifications, the platform profile map, control options, picking/putting functions, etc. may be varied in shape, size, coloration, organization, functionality, etc. Also, while the platform profile map configurations of FIGS. 9-10 have been described as illustrating the cart configuration, a portion of the cart configuration may be undisplayed, such as where there are too many rows, bins, etc. to display on the display screen of the mobile computing device comfortably. The undisplayed portions may be accessible, such as be scrolling horizontally or vertically to view additional bins/columns/rows. Gestures may also be used to interact with the mobile computing device, or more specifically with the platform profile map. For example, gestures such as tapping, double-tapping, swiping, pinching, stretching, circling, crossing, using multiple fingers, etc. on a touch sensitive screen of a mobile computing device may perform various operations, such as indicating completion of an order or incompletion, changing a number of items displayed on a counter, and so forth. Other types of interactions, such as voice commands, eye movements, non-contact gestures and so forth may also be detectable and used to perform operations.

In one example, the platform profile may be modifiable through the mobile computing device when the pick platform is modified or to match an existing pick platform configuration. The pick platform configuration may be changed on the fly and the changes may be reflected immediately in the graphical user interface. The platform profile may be modifiable using gestures or the like. For example, if a bin was moved to a different shelf on the pick platform, then the user may drag and drop a box corresponding to the bin from one shelf to another. If a smaller bin was replaced by a larger bin, the user may use two fingers on a touch screen of the mobile computing device to stretch the edges of the box to the appropriate size. In one example, the pick platform map may resize the boxes displayed for each shelf based on the number of boxes included for the shelf. However, in some examples, a cart may include bins spaced apart from one another. The boxes on the pick platform map may be similar spaced apart from one another. While modifications to the pick platform map may be made locally at the mobile computing device and transmitted to the director computing device, the director computing device may also be able to modify the platform profile or platform profile map.

In one example, the director computing device or the mobile computing device may analyze the pick instructions to aggregate item quantities across a plurality of orders included in the pick instructions. In other words, the pick instructions may include collective pick instructions for collectively picking multiple of a same item for multiple of the orders as a single quantity to be severally distributed to locations on the pick platform as highlighted on the platform profile map. Thus, the user may more efficiently pick the desired items by picking the item for each of the multiple orders at a same time rather than picking the item for a first order and then picking other items for the first order and then coming back to the item for a subsequent order.

In one example, different levels (e.g., shelves) on the pick platform may be color-coded to different colors. The display of platform profile may include a display of the levels with colors corresponding to the color-coded levels on the pick platform. For example, with reference to FIG. 10, box A3 may be colored in some way corresponding to a color marking on the top level of the pick platform, boxes B1, B4 and B5 may be colored differently than box A3 and may correspond to a color marking on a middle level of the pick platform and boxes C2, C3 and C5 may be colored differently than box A3 or boxes B1, B4 and B5, and may correspond to a color marking on a lower level of the pick platform. The box itself may be colored in the color matching the platform level, or a portion of the box or the contents in the box may be colored accordingly. For example, the labels B1, B4 and B5 may be the same color as the color marking on the pick platform. In another example, a bar of color may extend across the box behind the 'x' box, the box label (e.g., 131') and the check box. In another example, the background of the box may be highlighted in the color of the color marking on the corresponding pick platform level. The color marking on the pick platform level may be implemented in a number of ways. For example, the shelf may be colored, a vertical bar/post at ends of the shelf may be colored, a colored tag, sticker or other marker may be placed or attached to the level, etc. In another example, the different levels may include LED (light emitting diode) lights to light up in the appropriate color for each level. Color coding of the levels with a corresponding display of color on the mobile computing device may enable a user to quickly identify a level on which items are to be put without resorting to counting the levels on the display to match the levels with the pick platform.

The present technology may be implemented on the mobile computing device as a mobile computing device system. The present technology may be implemented at a director computing device as a director computing device system, where the pick platform map, pick instructions, etc. are provided for display on the mobile computing device with minimal computation by the mobile computing device. The present technology may be implemented using the computing capabilities of both the mobile computing device and the director computing device, where each device performs different, complementary functionality. Either device may work in cooperation with a handheld scanning device. Pick platforms may be used in connection with the computing device hardware as a platform for managing orders and items picked for the orders.

In one example, a warehouse management system may be provided as a plurality of pick platforms, a data store to store a platform profile for each of the plurality of pick platforms, and a director computing device. The director computing device may be configured to communicate with a mobile computing device associated with a pick platform and to transmit pick instructions to the mobile computing device based on the platform profile for the pick platform, the pick instructions including instructions to graphically distinguish portions of the pick platform to which items in a plurality of orders are to be picked from other portions of the pick platform representing orders omitting the items.

In some implementations, items may be stored on high shelves or in otherwise difficult to access locations. Carousels, vertical lift modules (VLM), robots, and the like may be used as intermediary devices to transport picked items from the shelf to the pick platform where the items are sorted for the different orders. When the user is picking the items from these locations, the user may simply know a quantity of the item to pick. The user may refer to the quantity on the item information display before using the VLM, for example, or may bring the mobile computing device on the VLM to pick the items. Because the user is not placing the items in the bins immediately, the platform profile map need not be displayed during this intermediate phase. Rather the mobile computing device may simply show the item information, such as the title, total quantity for the combined orders, item photograph, etc. Once the items have been picked and brought in proximity to the pick platform, the user may select to display the pick platform profile map, highlighting the bins into which the picked items are to be placed. For the intermediary phase, the picked items may be placed in a single collective bin. The picked items may include different types of items. The picked items in the intermediary or collective bin may be unorganized and may be organized when placed to the final bin on the pick cart. When the picked items in the collective bin include different types of items, the user may scan each of the different items when in proximity to the pick platform for the mobile computing device to highlight the bins into which the items are to be placed. This picking method, with the intermediary picking phase, may be 'suspended picking'.

Figure 11:
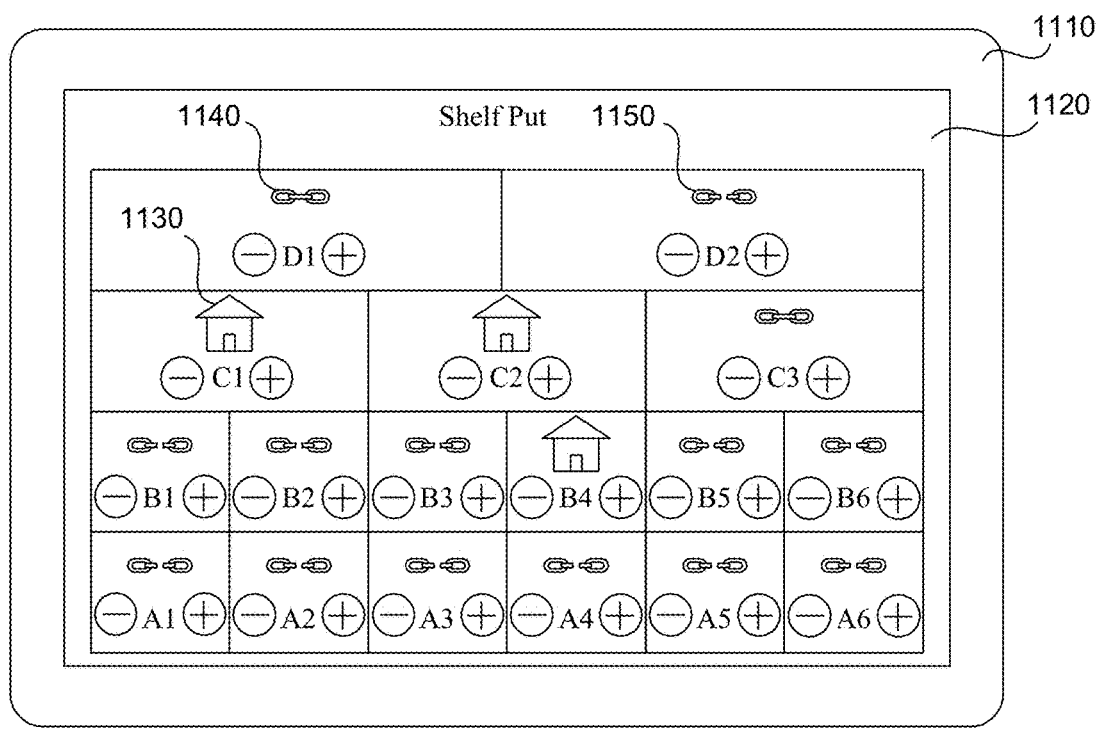
FIG. 11 is a graphical user interface on a mobile computing device for use in putting items to a warehouse shelf in accordance with an example of the present technology.

In addition to use in picking items for orders to be fulfilled, the graphically user interface may be used for putting items on the shelf, such as for stocking the items, re-stocking the items after a return or canceled order, and so forth. FIG. 11 illustrates a shelf put view of the graphical user interface 1120 on a mobile computing device 1110 in accordance with an example of the present technology. A handheld scanner may be used to scan a section of a shelf or rack unit on an aisle in a warehouse. The graphical user interface of FIG. 11 may represent the configuration of the shelves in the shelf unit of the section. The shelves may include bins, boxes or other containers or otherwise be divided or compartmentalized for placement of different items. The compartmentalization of the shelves may be represented by the boxes in FIG. 11 (labeled as A1, A2, etc.). The graphical user interface may include various controls or display options similar to those described above with respect to FIG. 10, such as quantity displays and controls, location or compartment identification (e.g., A1, A2, etc.), and so forth.

The present technology may further enable a system of random inventory with mixed product per location. Rather than directed put-away of items, the present technology enables users to decide where to put items. Users may divide a quantity of items to be put-away and put the items to different locations. The different locations may preferably be spaced with other intervening locations rather than right next to one another. Random inventory with mixed product per location may be useful in distributing inventory throughout a warehouse so that no single location becomes congested for processing a large number of orders and so that distance between different items of a same order is likely reduced to speed of picking time for the orders. Also, random inventory with mixed product per location enables large quantities of product to be distributed more evenly in available storage space without devoting a single, large space to the large quantity. Quantities of items in the warehouse may fluctuate and a large space dedicated to what may at times be a small quantity results in inefficient use of space. Also, because each location may contain mixed products or items, the physical space volume of each location may be more fully utilized. This may enable a warehouse to occupy a smaller footprint for a same quantity of varied products or may enable a warehouse to stock a larger quantity and/or variety of products without increasing the footprint of the warehouse. As a result revenue may be increased and/or expenses decreased.

The graphical user interface of FIG. 11 may enable a user to select a location to place items, or a location from where items may be removed. The addition or removal of items to a location may be managed using the '+' or '−' buttons or using other inventory control mechanisms provided through the interface of the mobile computing device or handheld scanner. The graphical user interface may include various indicators for use by the user in putting or removing items to or from the shelf. For example, a house image 1130 may represent a home or primary location for storing items. A home location may be one which is reserved for a particular item to the exclusion of other items. Locations without the home icon may be available for mixed product storage. The boxes on the interface also may include a connected chain or a broken chain. A connected chain 1140 may indicate that the location is chained, restricted, locked, or otherwise unavailable currently for putting or removing items. A broken chain 1150 may indicate that the location is available for items to be put to or removed from. Any of a variety of other icons may be used and/or the icons may be given different functionality or meaning depending upon a particular application.

Figure 12:
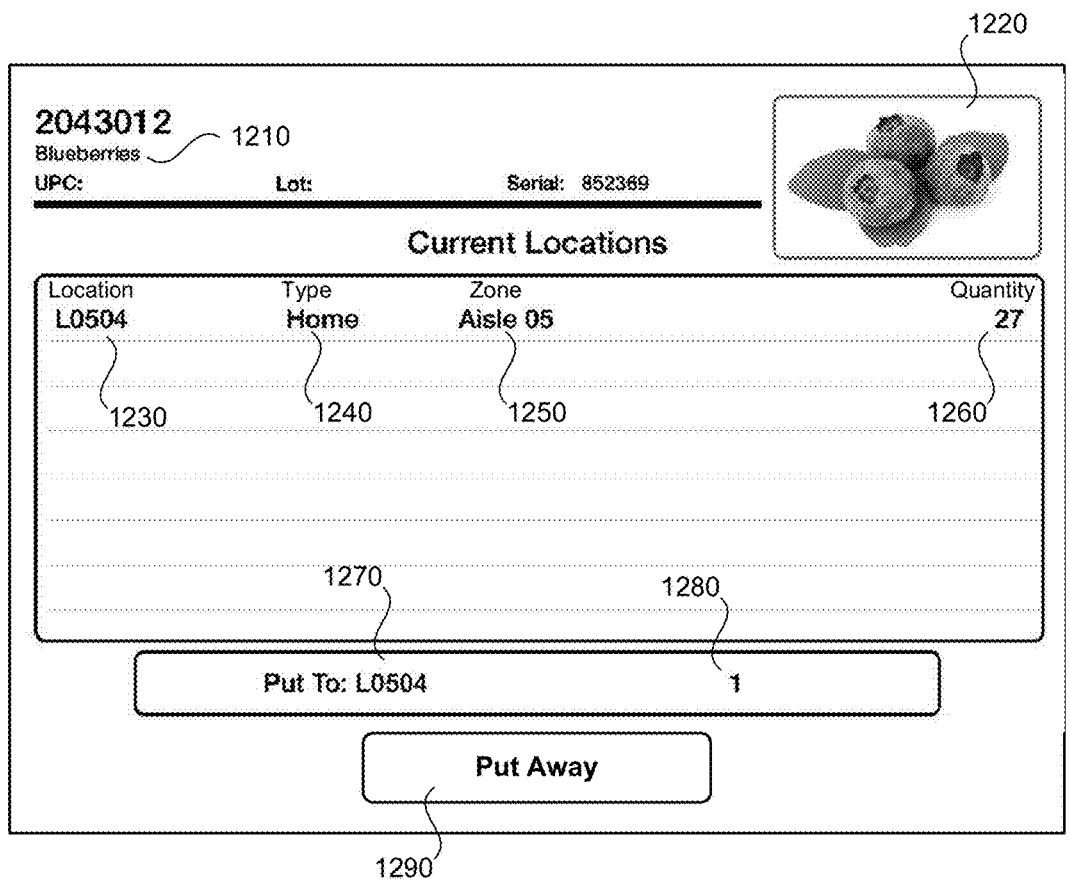
FIG. 12 is a graphical user interface for picking or putting items away in accordance with an example of the present technology.

FIG. 12 illustrates another example display screen for facilitating random inventory with mixed product per location. In this example, a product, "blueberries" is to be put away. A user may scan a barcode or other identifier on the blueberries to be put away and a graphical user interface such as the one in FIG. 12 may be displayed. The display may include an identification 1210 of the product, including an image 1220 of the product, and may identify current locations of the product in the warehouse. For example, FIG. 12 illustrates that blueberries are currently located at location L0504 1230 on Aisle 05 1240, that 27 units (quantity 1260) are available at this location, and the location type 1250 is "home" (see description of FIG. 11 for discussion of "home" type location).

The user may scan a desired put away location and the interface may display the scanned location 1270 where the blueberries to be put away are to be put. In FIG. 12, the location is the same location as the listed current location: L0504. The user may also enter the units or quantity 1280 of the product to be put to the location. In this example, the number of units to be put away is '1'. When the user selects the "put away" option 1290, the operation may be completed and the quantity of blueberries at location L0504 may be incremented by the number put away to the location (i.e., '1'). While this example illustrates a single location for the blueberries, a random inventory with mixed product per location scenario may commonly list multiple locations of different types, in different zones, and with different quantities for a same product. This user interface may be useful in determining from which location to pick a product, to which location to put a product and so forth.

The mobile computing device may thus store information regarding each location where a product is available. A user may be trained to combine unique items in a same location, but the system may preferably restrict a user from putting similar items in a same location. The inclusion of similar items in a same location may increase the difficulty and time in identifying the correct items when subsequently picking from the location, as well as increase the likelihood of error.

For example, where a warehouse stocks t-shirts, the mobile computing device may allow the user to put uniquely colored t-shirts, such as red t-shirts, blue t-shirts and green t-shirts in a same location. However, if the user wishes to put multiple different sizes of red t-shirts away, the mobile computing device may restrict the user from putting multiple different sizes in a same location. Rather, for example, the user may be permitted to place a 'small' size in one location, a 'medium' size in another location, a 'large' size in another location, and so forth.

Various rules may be implemented on the computing device, as may be received from the director computing device or included on the software of the mobile computing device. These rules may dictate which items may or may not be co-located, how far apart similar items are to be placed, and so forth. The rules may be used to enforce the home location, connected chain or broken chain locations, and so forth. The rules may include any suitable restriction for restricting the placement of products suitable for various implementations. For example, the system may allow a user to perform random placement of product within reason, but may restrict the user from placing chemicals that may react next to one another or even in a same location, such as placing bleach next to hydrogen peroxide. High value items may not be allowed to be put away in any location but may be restricted to a secure location. Any number of other rules are also conceivable. These rules may be defined at the mobile computing device or the director computing device. Defined rules may be propagated to other mobile computing devices in communication with the mobile computing device or director computing device where the rule was defined.

In addition to being used for put-away operations, the interface of FIG. 12 may be used for picking operations as well. For example, the pick instructions may display product information such as that in FIG. 12 and a user may select a location to begin picking. The user may select the location such as via the mobile computing device or by scanning the location after moving to the location. A subsequent display screen may illustrate the total quantity of the item to be picked for the aggregated orders, and a further subsequent display may illustrate the platform profile map with highlighted locations when the user is ready to put the items to the bins on the pick platform.

Figure 13:
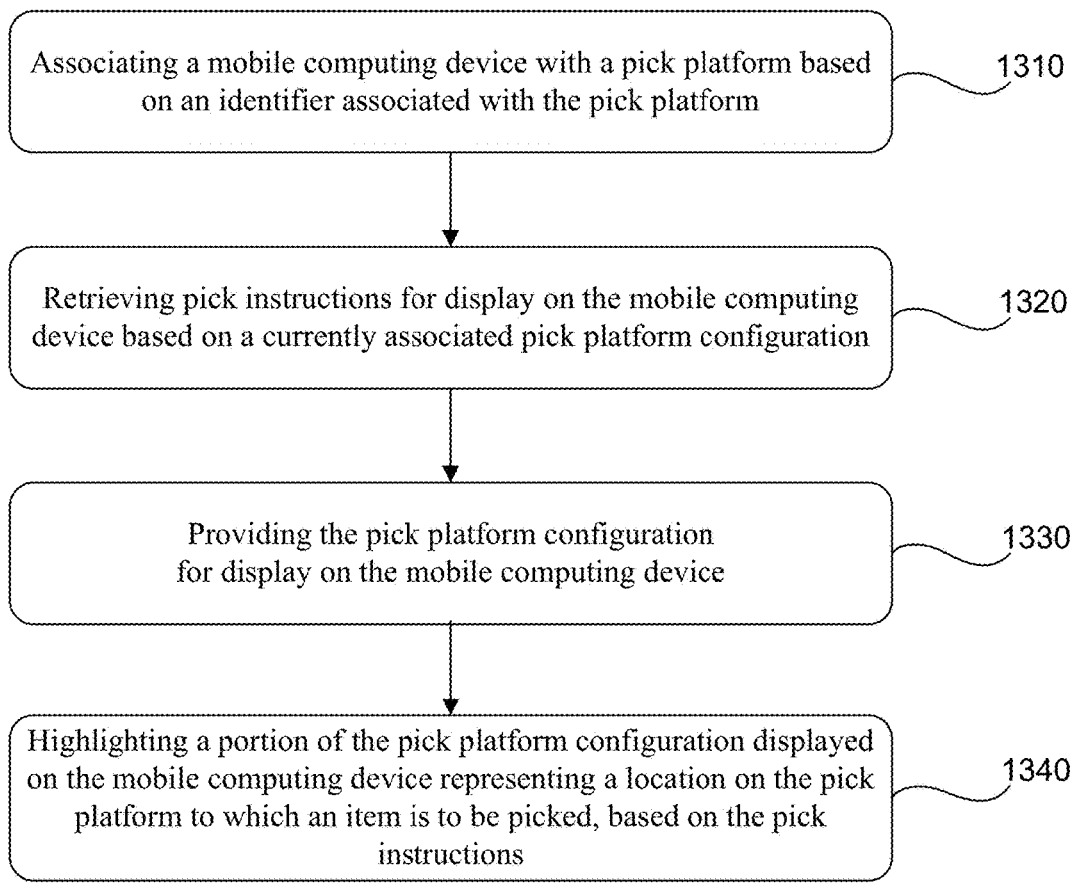
FIGS. 13-14 are flow diagrams of warehouse management methods is in accordance with examples of the present technology.
Figure 14:
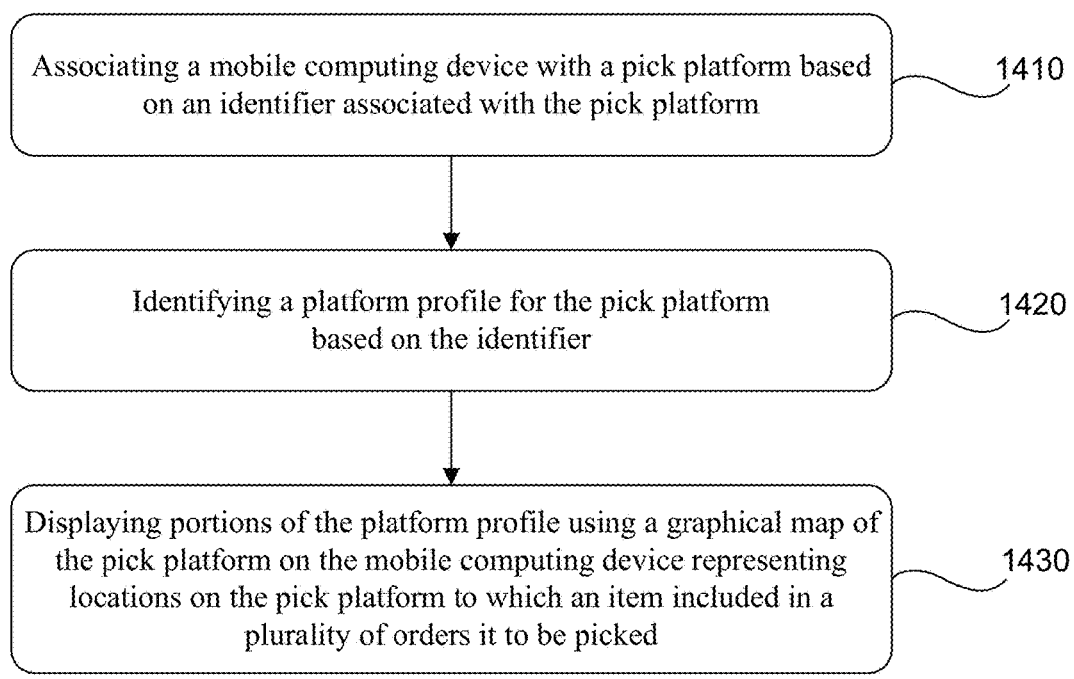

FIGS. 13-14 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring to FIG. 13, a warehouse management method is illustrated as a flow diagram in accordance with an example of the present technology. The method may include associating 1310 a mobile computing device with a pick platform based on an identifier associated with the pick platform and retrieving 1320 pick instructions for display on the mobile computing device based on a currently associated pick platform configuration. The method may include providing 1330 the pick platform configuration or platform profile map for display on the mobile computing device. A portion of the pick platform configuration displayed on the mobile computing device may be highlighted 1340 to represent a location on the pick platform to which an item is to be picked, based on the pick instructions, or rather a location to which an item is to be put after being picked from a warehouse location.

The method may include dissociating the mobile computing device from the pick platform and associating the mobile computing device with a second pick platform having a different pick platform configuration. The appropriate locations on a platform profile map of the different pick platform configuration may be highlighted for orders received after creating the new association.

The pick instructions may include instructions to pick items for multiple orders from at least one of multiple available product locations. This may be a result of random inventory with mixed product per location. The pick instructions may include a designation of the various locations where the items are available, as described with respect to FIG. 12. In addition to being used for picking products from locations with random, mixed inventory, the method may receive input from a user to put mixed items at user-determined locations and optionally restrict placement of the mixed items based on pre-defined rules, using the mobile computing device. Some example rules for restricting placement may include restricting placement of same items in adjacent locations; restricting placement of multiple sizes of a same item in a same location; restricting placement of items of a similar color in a same location; or restricting placement of chemically reactive items in a same location or in adjacent locations. As has been described, photographs of the items may be stored and available for display. To implement rules based on color restrictions, the mobile computing device may analyze the photographs of the two different products to determine a degree of similarity or difference in color. An objective for restricting similar colors is to increase the speed, efficiency and accuracy with which products may be picked from warehouse locations. In one example, the method may include providing indicators for display of the mobile computing device consistent with the pre-defined rules indicating whether the item is allowed or disallowed to be placed at a placement location. Some example indicators may include the linked and broken chains illustrated in FIG. 11 or open and closed padlocks or the like.

The method may include receiving input from a user to perform a suspended pick operation. For example, identification of the item in at least one of the plurality of orders may be received as the item is moved from a location to an unorganized suspended pick platform. The at least one of the plurality of orders may be suspended as incomplete for the at least one of the plurality of orders including the item. Identification of the item may be received as the item is moved from the unorganized suspended pick platform, such as by scanning the item. The at least one of the plurality of orders may be completed when the item is moved from the unorganized suspended pick platform to the highlighted portion or location of the pick platform.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

With reference to FIG. 14, another warehouse management method using a pick platform is illustrated in accordance with an example of the present technology. The method may include associating 1410 a mobile computing device with a pick platform based on an identifier associated with the pick platform, identifying 1420 a platform profile for the pick platform based on the identifier, and displaying 1430 portions of the platform profile using a graphical map of the pick platform on the mobile computing device representing locations on the pick platform to which an item included in a plurality of orders it to be picked.

The present technology may enable picking of items for multiple orders using a single graphical display. In other words, multiple orders may be associated with a graphical display. A user may pick same items for each order to be picked by the user. The user may pick a sufficient quantity of a same item for each of the orders to be fulfilled on the pick cart and then may divide or sort the items to the appropriate bin. In other words, the system may analyze each of the orders assigned to be picked by the user, aggregate items to be picked into a single quantity for each item, and display the aggregate number to the user. When the user completes picking the items, the graphical interface may display the location of the bins and the quantity of items for each of the items.

In one example, the boxes on the mobile computing device corresponding to bin locations on the pick platform may be highlighted before an item is scanned to be put to the bins. In another example, the boxes on the mobile computing device corresponding to bin locations on the pick platform may be highlighted after an item is scanned to be put to the bins. In some examples, the system may forgo scanning of the item either before or after highlighting and allow a user to view the item, put the item in the appropriate bin, and indicate completion of the pick, without scanning items or locations. This option may be implemented based on experience of the individual user, personal or business operation preferences or otherwise to suit a particular application.

In one example, after picking of an item for an order is complete, the boxes may remain highlighted until the next item is selected. The boxes may be optionally modified in some way to indicate completion or remain unchanged. For example, a modification may be that that number of items picked is changed to match the number of items requested for an order, or the selection of the check box of FIG. 10.

Similarly as mentioned in the description of the method illustrated in FIG. 13, additional example details, operations, options, variations, etc. that may be part of the method illustrated in FIG. 14 have been described previously herein and/or are described in further detail below. Various systems, devices, components, modules and so forth for implementing the method may also be used, as described with respect to the various examples included in this disclosure.

In some examples, this or other methods described herein may be implemented wholly or partially as computer readable program code executed by a processor and the computer readable code may be embodied on a non-transitory computer usable medium.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium or computer readable storage device that includes volatile and non-volatile, removable and non-removable media implemented with any technology for the storage of information such as computer readable instructions, data structures, program modules, or other data. Computer readable storage media include, but is not limited to, RAM (Random-Access Memory), ROM (Read-Only Memory), EEPROM (Electrically Erasable Programmable Read-Only Memory), flash memory or other memory technology, CD-ROM (Compact Disc, Read-Only Memory), DVD (Digital Versatile Discs) or other optical storage, magnetic cassettes, magnetic tapes, magnetic disk storage or other magnetic storage devices or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. By way of example, and not limitation, communication media includes wired media such as a wired network or direct-wired connection, and wireless media such as acoustic, radio frequency, infrared and other wireless media. The term computer readable media as used herein includes communication media.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Reference has been made to the examples illustrated in the drawings, and specific language has been used herein to describe the same. It will nevertheless be understood that no limitation of the scope of the technology is thereby intended. Alterations and further modifications of the elements illustrated herein, and additional applications of the examples as illustrated herein, which would occur to one skilled in the relevant art and having possession of this disclosure are to be considered within the scope of the description.

With the general examples set forth herein, it is noted that when describing a system, or the related devices or methods, individual or separate descriptions are considered applicable to one other whether or not explicitly discussed in the context of a particular example or embodiment. Furthermore, various modifications and combinations may be derived from the present disclosure and illustrations, and as such, the figures should not be considered limiting.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A warehouse management system, comprising:
a plurality of pick platforms;
a data store to store pick instructions and a platform profile for each of the plurality of pick platforms; and
a mobile computing device configured to be associated with a pick platform and to retrieve the platform profile from the data store for the pick platform upon association with the pick platform, the mobile computing device being further configured to graphically display the platform profile, using a highlight module, and to highlight a location on a platform profile map corresponding to a pick platform profile for a pick platform, the location representing a location to which an item included in the plurality of orders is to be picked and the platform profile map being a graphical representation of the platform profile;
wherein the highlight module provides reduced visibility or functionality of a second location on the platform profile map for a predefined condition; and
wherein the pick instructions comprise pick instructions for picking a plurality of orders to the pick platform and are based on the platform profile.

2. The system of claim 1, wherein the predefined condition is an order omitting the item.

3. The system of claim 1, wherein the predefined condition is the item having been picked.

4. The system of claim 1, wherein the platform profile reflects a number and arrangement of bins on the pick platform.

5. The system of claim 1, wherein different of the plurality of pick platforms comprise different platform profiles.

6. The system of claim 1, wherein the platform profile is modifiable through the director computing device or through the mobile computing device when the pick platform is modified.

7. The system of claim 1, wherein the mobile computing device comprises an overflow module to enable placement of the item in an overflow location different than the location highlighted.

8. The system of claim 1, wherein the mobile computing device comprises a partial pick module to enable partial completion of at least one of the orders.

9. The system of claim 8, wherein the partial pick module further enables resuming picking the at least one of the orders.

10. The system of claim 1, wherein the pick instructions comprise collective pick instructions for collectively picking multiple of a same item for multiple of the plurality of orders as a single quantity to be severally distributed to locations on the pick platform as highlighted on the platform profile.

11. The system of claim 1, wherein different levels on the pick platform are color-coded to a different color, and wherein the mobile computing device is configured to provide the display of the platform profile including a display of the levels with colors corresponding to the color-coded levels on the pick platform.

12. The system of claim 1, wherein the pick instructions comprise an image of the item included in at least one of the plurality of orders.

13. A warehouse management method, comprising:
associating a mobile computing device with a pick platform based on an identifier associated with the pick platform;
retrieving pick instructions for display on the mobile computing device based on a currently associated pick platform configuration;
providing the pick platform configuration for display on the mobile computing device;
graphically highlighting a first portion of the pick platform configuration displayed on the mobile computing device representing a location on the pick platform to which an item is to be picked, based on the pick instructions; and
providing reduced visibility or functionality of a second portion of the pick platform configuration for a predefined condition, the second portion being separate from the first portion.

14. The method of claim 13, further comprising dissociating the mobile computing device from the pick platform and associating the mobile computing device with a second pick platform having a different pick platform configuration.

15. The method of claim 13, wherein the pick instructions comprise instructions to pick items for the plurality of orders from at least one of a plurality of locations as a result of random inventory with mixed product per location, the pick instructions including a designation of the plurality of locations where the items are available.

16. The method of claim 13, further comprising receiving input from a user to put mixed items at user-determined locations, and restricting placement of the mixed items using the mobile computing device based on pre-defined rules.

17. The method of claim 16, wherein the predefined rules include at least one rule selected from the group consisting of:
   restricting placement of same items in adjacent locations;
   restricting placement of multiple sizes of a same item in a same location;
   restricting placement of items of a similar color in a same location; or
   restricting placement of chemically reactive items in a same location or in adjacent locations.

18. The method of claim 16, further comprising providing indicators for display of the mobile computing device consistent with the pre-defined rules indicating whether the item is allowed or disallowed to be placed at a placement location.

19. The method of claim 13, further comprising receiving input from a user to perform a suspended pick operation, comprising:
   receiving identification of the item in at least one of the plurality of orders as the item is moved from a location to an unorganized suspended pick platform;
   suspending the at least one of the plurality of orders as incomplete for the at least one of the plurality of orders including the item;
   receiving identification of the item as the item is moved from the unorganized suspended pick platform; and
   completing the at least one of the plurality of orders when the item is moved from the unorganized suspended pick platform to the highlighted portion of the pick platform.

20. A warehouse management system, comprising:
   a plurality of pick platforms;
   a platform profile data store to store a platform profile for each of the plurality of pick platforms; and
   a mobile computing device configured to communicate with a director computing device and associated with a pick platform, the mobile computing device configured to receive pick instructions from the director computing device based on the platform profile for the pick platform, the pick instructions including instructions to graphically distinguish portions of the pick platform to which items in a plurality of orders are to be picked from other portions of the pick platform representing orders omitting the items, wherein the graphically distinguished portions of the pick platform representing orders omitting the items have reduced visibility or functionality.

21. A computer-implemented warehouse management method using a pick platform, comprising:
   associating a mobile computing device with a pick platform based on an identifier associated with the pick platform;
   identifying a platform profile for the pick platform based on the identifier;
   displaying a portion of the platform profile of the pick platform using the mobile computing device, the portion representing a location on the pick platform to which an item included in a plurality of orders is to be put; and
   graphically distinguishing a portion of the platform profile representing a location on the pick platform from which the item is to be omitted from the portion representing the location to which the item is to be put, the portion from which the item is to be omitted having reduced visibility or functionality.

* * * * *